(12) United States Patent
Amimoto et al.

(10) Patent No.: US 10,128,065 B2
(45) Date of Patent: Nov. 13, 2018

(54) ROTATION TRANSMITTING MECHANISM AND LEVER SWITCH ADOPTING ROTATION TRANSMITTING MECHANISM

(71) Applicant: Valeo Japan Co., Ltd., Saitama (JP)

(72) Inventors: Kenji Amimoto, Tokyo (JP); Takeshi Okuhara, Tokyo (JP)

(73) Assignee: Valeo Japan Co., Ltd. (JP)

( * ) Notice: Subject to any disclaimer, the term of this patent is extended or adjusted under 35 U.S.C. 154(b) by 246 days.

(21) Appl. No.: 15/153,700

(22) Filed: May 12, 2016

(65) Prior Publication Data

US 2016/0336129 A1 Nov. 17, 2016

(30) Foreign Application Priority Data

May 13, 2015 (JP) .................................. 2015-097851

(51) Int. Cl.
*H01H 21/22* (2006.01)
*F16D 3/72* (2006.01)
(Continued)

(52) U.S. Cl.
CPC ........... *H01H 21/22* (2013.01); *B60Q 1/1476* (2013.01); *F16D 3/66* (2013.01); *F16D 3/72* (2013.01);
(Continued)

(58) Field of Classification Search
CPC .......... H01H 3/38; H01H 19/14; H01H 21/04; H01H 21/22; H01H 25/065;
(Continued)

(56) References Cited

U.S. PATENT DOCUMENTS 1,472,782 A    11/1923  Barber
1,621,428 A *  3/1927   Pedersen .................. F16D 3/72
                                                          267/168
(Continued)

FOREIGN PATENT DOCUMENTS

EP    0645280 A2   3/1995
EP    0913940 A2   5/1999
(Continued)

OTHER PUBLICATIONS

English Abstract for JP 2011-150948A.
(Continued)

*Primary Examiner* — Adam D Rogers
(74) *Attorney, Agent, or Firm* — Fishman Stewart PLLC

(57) ABSTRACT

A rotation transmitting mechanism may include first and second tubular holders connected to first and second tubular members, respectively, to be incapable of rotating relative thereto, and a third tubular holder provided to project from an inside of the second tubular holder to the first tubular holder side and connected to the second tubular holder to be incapable of rotating relative thereto. The rotation transmitting mechanism may also include an inner coil spring, the ends of which are inserted inside of and respectively fixed to the first and third tubular holders, and an outer coil spring, the ends of which are inserted outside of and respectively fixed to the first and third tubular holders. The coils may have the same winding direction. In certain states, the second and third tubular holders may be connected to be incapable of rotating relative to each other.

20 Claims, 8 Drawing Sheets

(51) Int. Cl.
  *H01H 19/14* (2006.01)
  *H01H 3/38* (2006.01)
  *H01H 25/06* (2006.01)
  *G05G 13/00* (2006.01)
  *H01H 21/04* (2006.01)
  *B60Q 1/14* (2006.01)
  *F16D 3/66* (2006.01)

(52) U.S. Cl.
  CPC ............... *G05G 13/00* (2013.01); *H01H 3/38* (2013.01); *H01H 19/14* (2013.01); *H01H 21/04* (2013.01); *H01H 25/065* (2013.01); *H01H 2235/01* (2013.01)

(58) Field of Classification Search
  CPC .... H01H 2235/01; B60Q 1/1476; F16D 3/66; F16D 3/72; G05G 13/00; F16C 1/102
  See application file for complete search history.

(56) References Cited

U.S. PATENT DOCUMENTS

| | | | | |
|---|---|---|---|---|
| 3,347,061 A * | 10/1967 | Stuemky | ............... | F16D 3/72 29/436 |
| 3,448,591 A * | 6/1969 | Spyra | ............... | F16D 3/72 464/60 |
| 3,726,133 A * | 4/1973 | Morgan | ............... | F16D 3/72 464/58 |
| 5,123,311 A | 6/1992 | Dymek | | |
| 5,803,812 A | 9/1998 | Kakiuchi et al. | | |
| 6,974,386 B1 * | 12/2005 | Devenyi | ............... | F16D 3/72 464/40 |
| 7,070,033 B2 * | 7/2006 | Jansen | ............... | F16D 41/20 192/110 R |
| 7,488,907 B2 * | 2/2009 | Funahashi | ............ | B60Q 1/1476 200/61.54 |
| 9,679,717 B2 * | 6/2017 | Ishigure | ............... | H01H 19/14 |
| 9,721,737 B2 * | 8/2017 | Ishigure | ............... | B60Q 1/1476 |
| 9,997,310 B2 * | 6/2018 | Ishigure | ............... | B60Q 1/1476 |
| 2008/0207337 A1 | 8/2008 | Rigby et al. | | |
| 2014/0323231 A1 | 10/2014 | Perry | | |

FOREIGN PATENT DOCUMENTS

| | | | | |
|---|---|---|---|---|
| FR | 937209 A | * | 8/1948 | ............... F16D 3/72 |
| FR | 2612682 A1 | | 9/1988 | |
| GB | 2142944 A | | 1/1985 | |
| JP | 2011-150948 A | | 8/2011 | |

OTHER PUBLICATIONS

European Search Report dated Sep. 16, 2016; Issued for EP application 16167810.
English Abstract of FR 2612682.

* cited by examiner

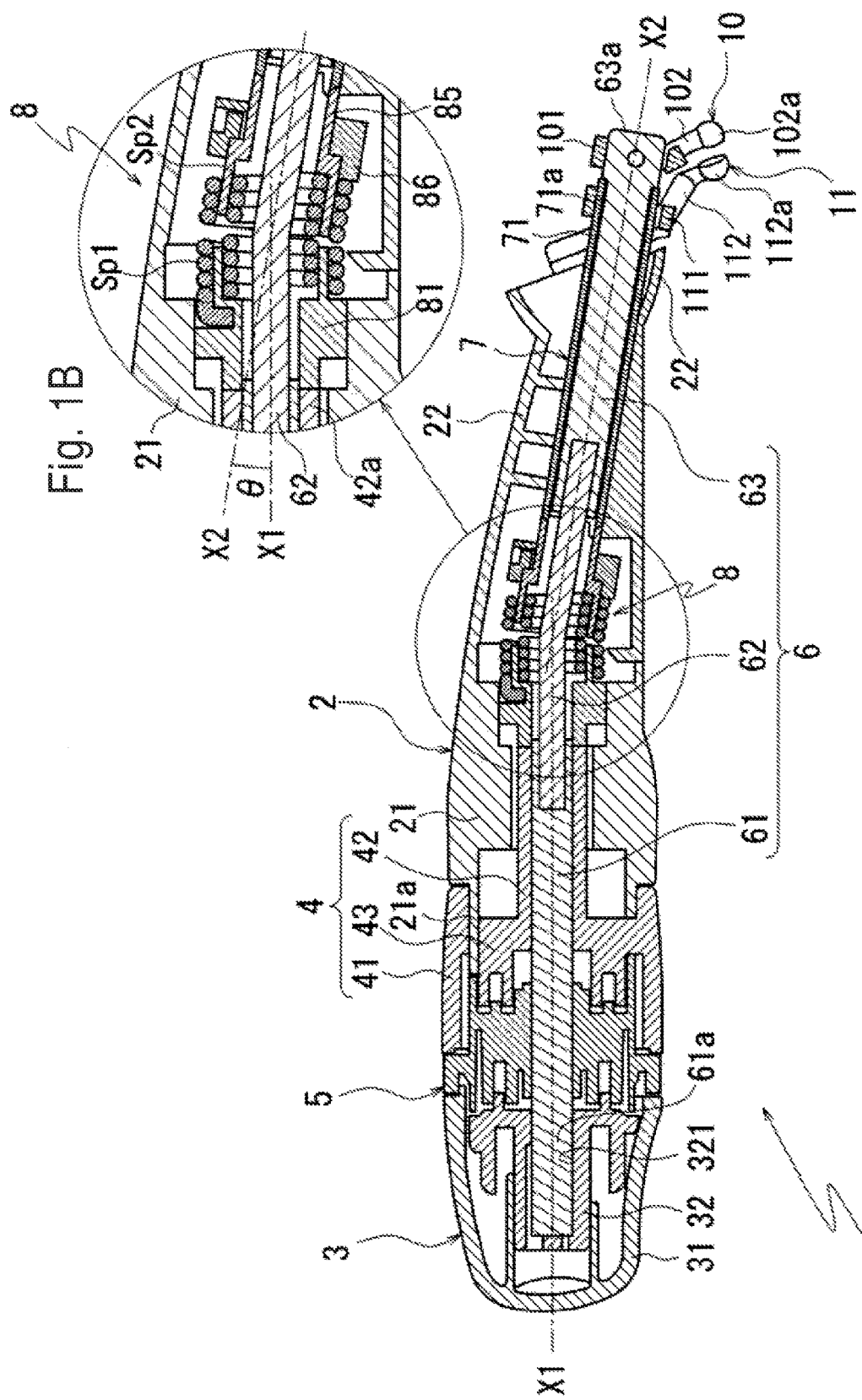

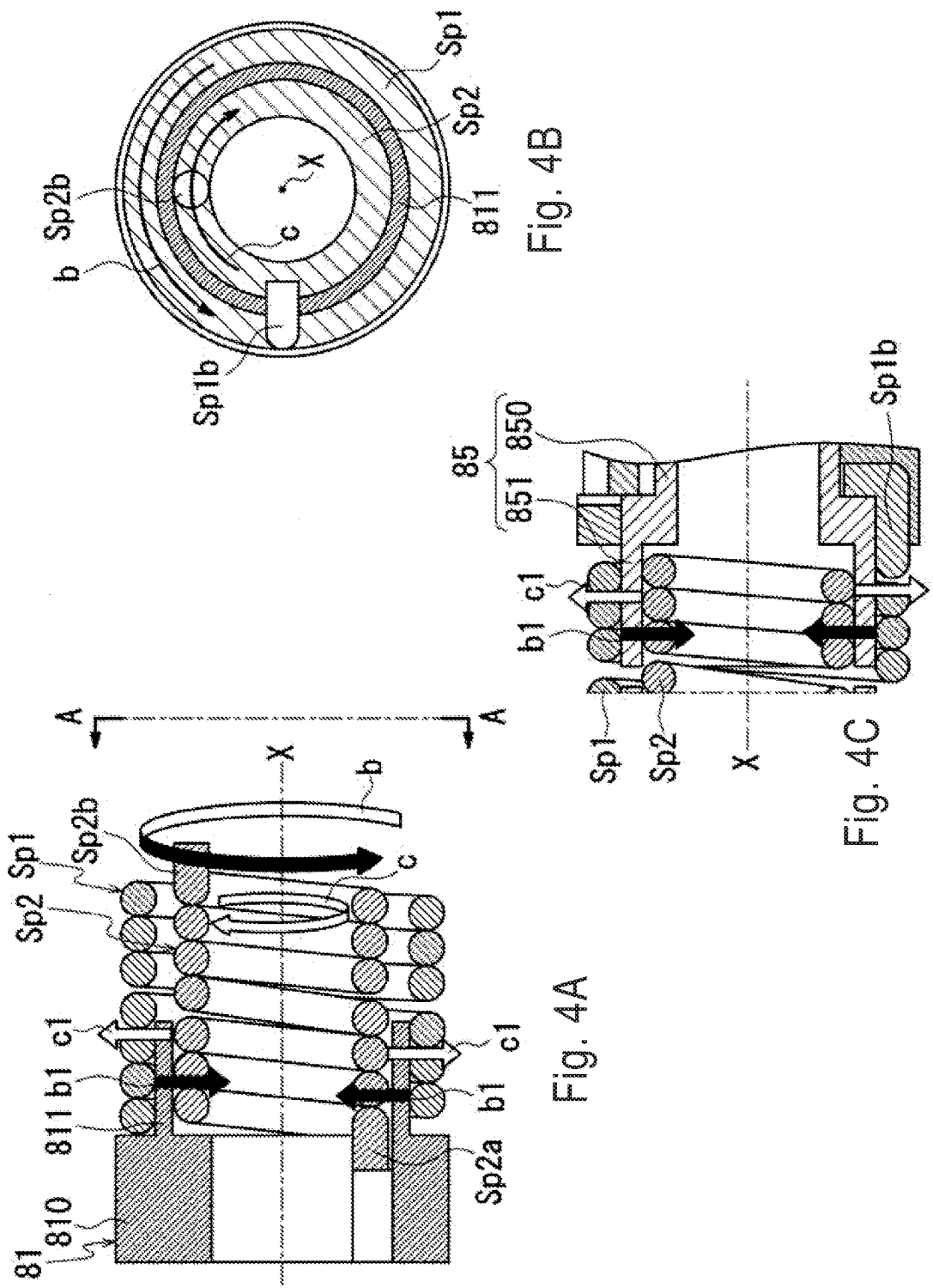

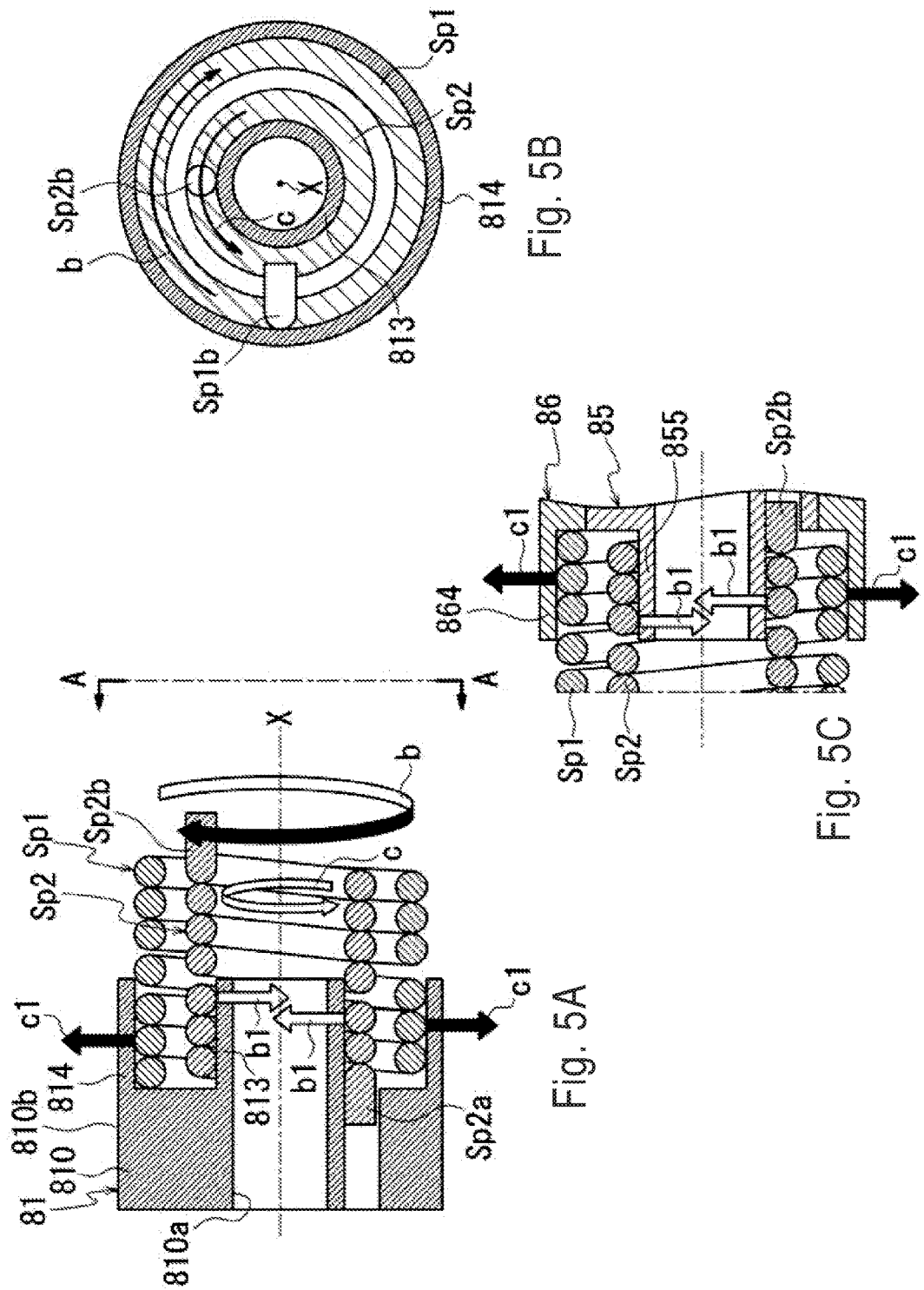

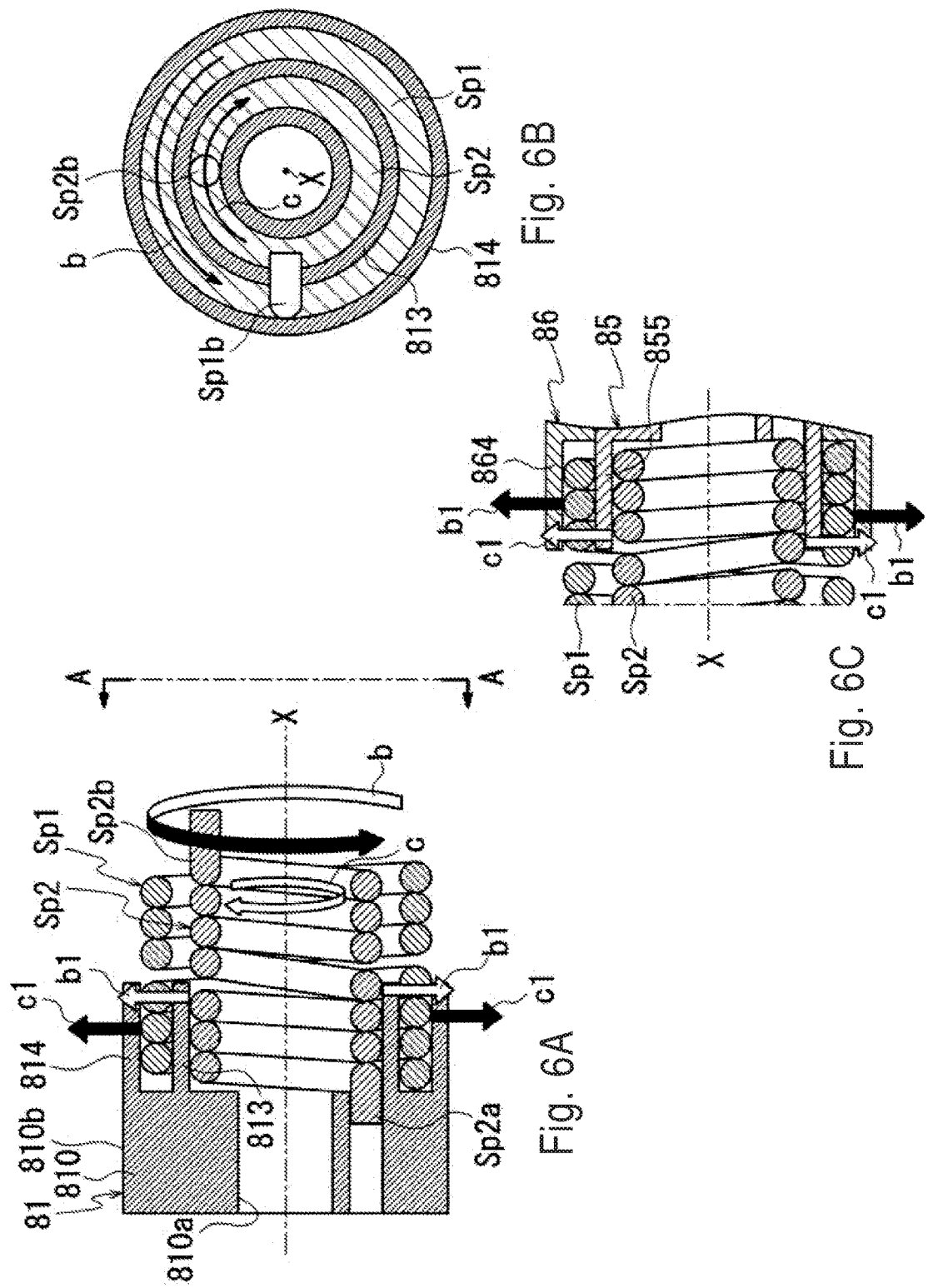

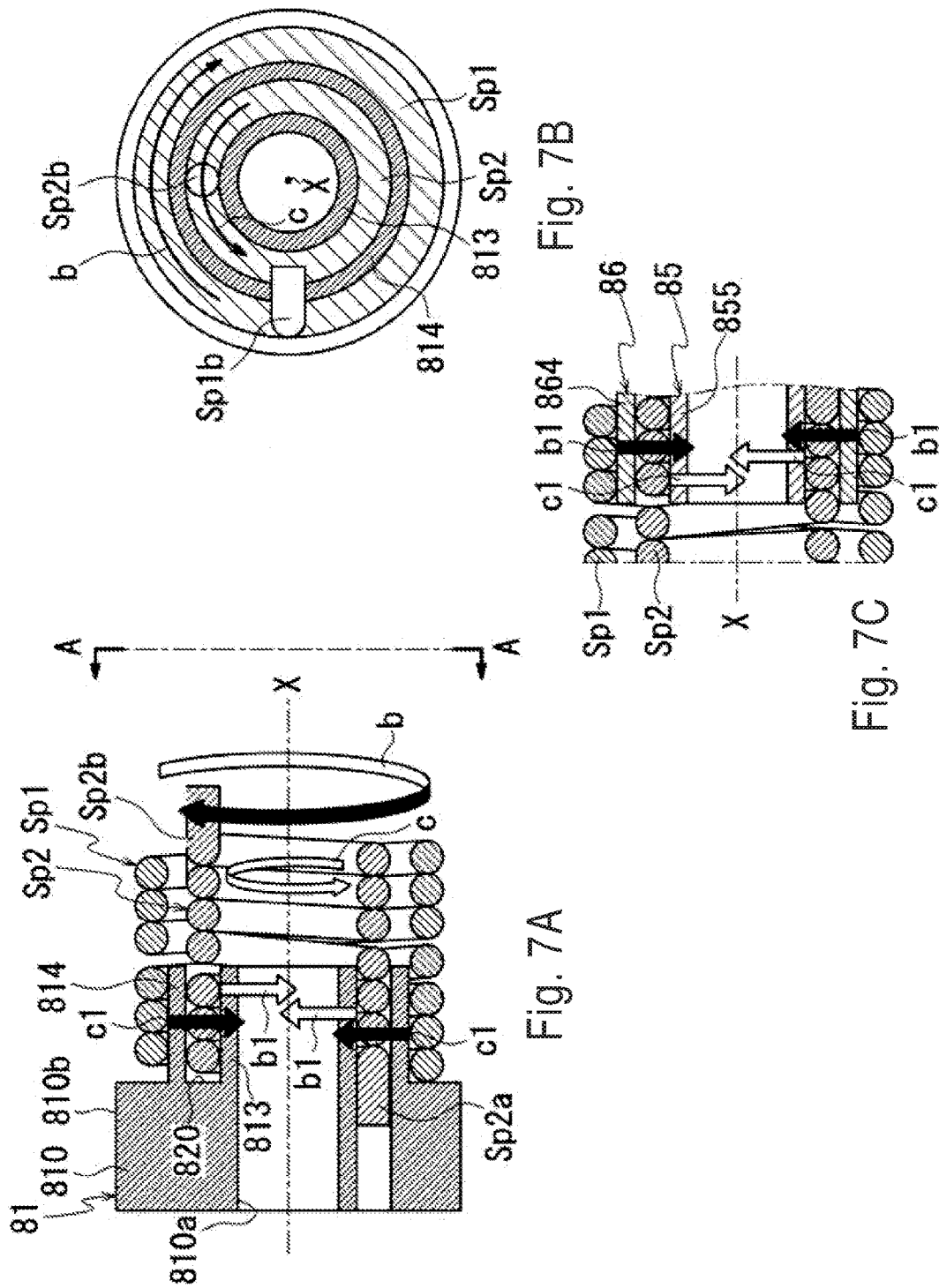

ROTATION TRANSMITTING MECHANISM AND LEVER SWITCH ADOPTING ROTATION TRANSMITTING MECHANISM

CROSS-REFERENCE TO RELATED APPLICATIONS

This application claims priority to Japanese Patent Application No. 2015-097851 filed on May 13, 2015, the disclosure of which is incorporated by reference herein.

TECHNICAL FIELD

The present invention relates to a rotation transmitting mechanism and a lever switch adopting the rotation transmitting mechanism.

BACKGROUND

An operating lever provided in a lever switch for vehicle, for example, is provided with two rotary knobs rotatable around a center axis of the operating lever to be spaced therebetween (for example, refer to Japanese Patent Laid-Open Publication No. 2011-150948).

FIGS. 8A and 8B are cross sections each explaining a typical configuration of a lever switch having an operating lever provided with two knobs spaced therebetween in a rotational axis X direction, the two knobs comprising a first rotary knob 105 and a second rotary knob 110 that are rotatable around a center axis of the operating lever. FIG. 8A is a cross section illustrating an operating lever 100 having a linear case 120, and FIG. 8B is a cross section illustrating an operating lever 100A having a curved case 120A.

As illustrated in FIG. 8A, in the operating lever 100 provided with the two rotary knobs of this type, rotation of the first rotary knob 105 positioned in a tip end of the operating lever 100 is transmitted to a first operating element 107 through a first rotation transmitting member 106 in a columnar shape and rotation of the second rotary knob 110 adjacent to the first rotary knob 105 is transmitted to a second operating element 114 through a second rotation transmitting member 113 in a cylindrical shape.

In addition, when the first operating element 107 is displaced in association with the rotation of the first rotary knob 105, an unillustrated first switch turns on/off by the first operating element 107, and when the second operating element 114 is displaced in association with the rotation of the second rotary knob 110, an unillustrated second switch turns on/off by the second operating element 114.

Since the rotation of the second rotary knob 110 is performed through the second rotation transmitting member 113 inserted outside of the first rotation transmitting member 106 in the operating lever 100, the first rotation transmitting member 106 and the second rotation transmitting member 113 each are necessarily formed in a linear shape.

Therefore the case 120 of the operating lever 100 that accommodates the first rotation transmitting member 106 and the second rotation transmitting member 113 necessarily has a linear outer appearance.

Recently, for creating a design to the operating lever, there has been proposed a case 120A having an outer appearance curved halfway in the longitudinal direction (refer to FIG. 8B).

However, in a case of the operating lever 100A provided with this case 120A, since the conventional linear rotation transmitting members (the first rotation transmitting member 106 and the second rotation transmitting member 113) cannot be used, a rotation detecting portion 130 (contact point structure) for detecting rotation of each of the first rotary knob 105 and the second rotary knob 110 is installed inside of the operating lever 100A, and a signal indicative of the rotation of each of the first rotary knob 105 and the second rotary knob 110 detected by the rotation detecting portion 130 is taken out by a harness 121 lying in the case 120A.

In this case, however, because of the increased numbers of components configuring the operating lever, there occurs a problem of an increase in manufacturing costs of the operating lever.

Therefore there is a demand for the operating lever provided with the two rotary knobs spaced therebetween, which can adopt a case having a curved outer appearance while suppressing an increase in manufacturing costs of the operating lever.

SUMMARY

Accordingly, the present invention is made in view of the above-described problems, and an object of the present invention is to provide a rotation transmitting mechanism and a lever switch with the rotation transmitting mechanism that can adopt a case having a curved outer appearance while suppressing an increase in manufacturing costs of an operating lever.

According to the present invention, a rotation transmitting mechanism that is inserted outside of a rotation transmitting member for connecting a first shaft member and a second shaft member by a flexible shaft to be rotatable integrally and connects a first tubular member inserted outside of the first shaft member side and a second tubular member inserted outside of the second shaft member side for rotation transmission, the rotation transmitting mechanism comprising:

a first tubular holder connected to the first tubular member to be incapable of rotating relative thereto, a second tubular holder connected to the second tubular member to be incapable of rotating relative thereto, a third tubular holder provided to project from an inside of the second tubular holder to the first tubular holder side and connected to the second tubular holder to be incapable of rotating relative thereto, an inner coil spring having one end side and the other end side in the longitudinal direction that are inserted inside of the first tubular holder and the third tubular holder, the one end and the other end being respectively fixed to the first tubular holder and the third tubular holder, and an outer coil spring having one end side and the other end side in the longitudinal direction that are inserted outside of the first tubular holder and the third tubular holder, the one end and the other end being respectively fixed to the first tubular holder and the second tubular holder, wherein a winding direction of the inner coil spring is the same as that of the outer coil spring, and in a state where an angular position of the second tubular holder around a center axis thereof is arranged in an angular position where torsional stress of causing an inner periphery of the outer coil spring to come into pressure contact with the first tubular holder and the third tubular holder acts on the outer coil spring, and an angular position of the third tubular holder around the center axis is arranged in an angular position where torsional stress of causing an outer periphery of the inner coil spring to come into pressure contact with the first tubular holder and the third tubular holder acts on the inner coil spring, the second tubular holder and the third tubular holder are connected to be incapable of rotating relative to each other.

According to the present invention, the inner periphery of the outer coil spring is in pressure contact with the first tubular holder and the third tubular holder, and the outer periphery of the inner coil spring is in pressure contact with the first tubular holder and the third tubular holder. Therefore in a case where the rotation input to the first tubular holder rotates the first tubular holder either in a clockwise direction or counterclockwise direction around the rotary shaft, the rotation input from the first tubular member to the first tubular holder is quickly transmitted through any of the outer coil spring and the inner coil spring to the second tubular holder or the third tubular holder connected to be incapable of rotating relative thereto.

As a result, the rotation input from the first tubular member to the first tubular holder is finally transmitted from the second tubular holder to the second tubular member.

Here, since the outer coil spring and the inner coil spring can curve halfway in the longitudinal direction, the rotation transmitting mechanism can be provided within the case of the curved outer appearance to be used for rotation transmission of the rotary knob.

Further, even in a case of adopting the case of the curved outer appearance, the rotation of the rotary knob can be transmitted without providing the contact point structure and harness, therefore suppressing an increase in manufacturing costs of the operating lever.

BRIEF DESCRIPTION OF THE DRAWINGS

Other objects, features, and advantages of the present invention will become more apparent from the following detailed description made with reference to the accompanying drawings, in which like parts are designated by like reference numbers and in which:

FIGS. 1A and 1B are diagrams explaining an operating lever of a lever switch according to an embodiment in the present invention;

FIGS. 4A, 4B and 4C are diagrams explaining an essential part of the rotation transmitting mechanism according to the embodiment;

FIGS. 5A, 5B and 5C are diagrams explaining an essential part of a rotation transmitting mechanism according to a modification;

FIGS. 6A, 6B and 6C are diagrams explaining an essential part of a rotation transmitting mechanism according to a different modification;

FIGS. 7A, 7B and 7C are diagrams explaining an essential part of a rotation transmitting mechanism according to a further different modification.

DETAILED DESCRIPTION

Figure 2A:
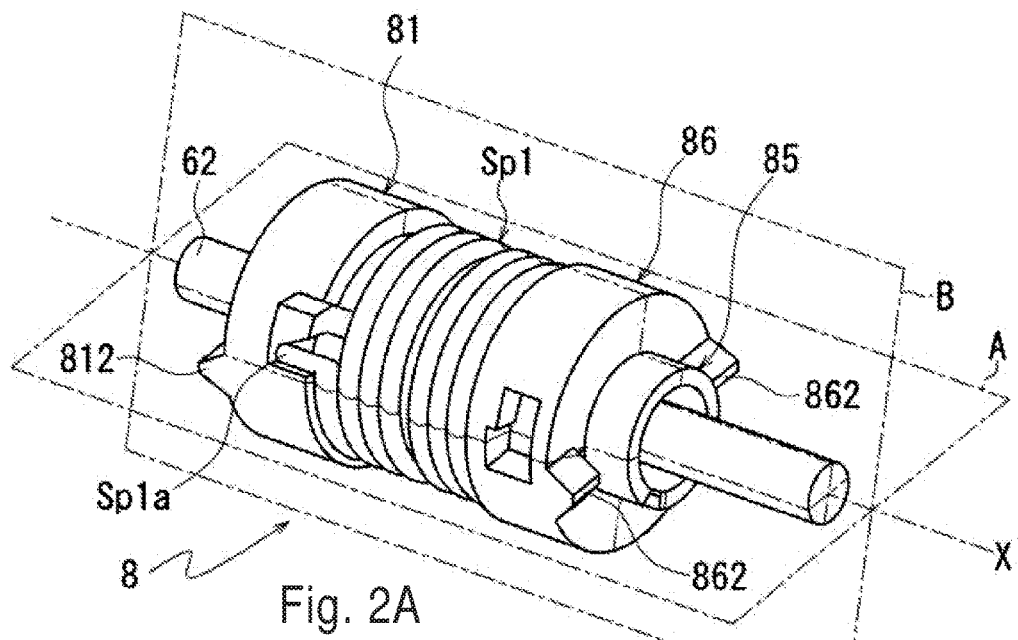
FIGS. 2A to 2D are diagrams explaining a rotation transmitting mechanism according to the embodiment.

Hereinafter, an explanation will be made of an operating lever of a lever switch according to an embodiment of the present invention.

FIG. 1A is a cross section illustrating an operating lever 1 of a lever switch according to an embodiment in the present invention and is an enlarged cross section illustrating a part thereof.

As illustrated in FIGS. 1A and 1B, the operating lever 1 has a tubular case 2, which has an outer appearance curved in the halfway position of the longitudinal direction.

On end part 21 of the case 2 in the longitudinal direction is provided with two rotary knobs 3, 4 rotating around a center axis X1.

The rotary knobs 3, 4 are provided coaxially on the center axis X1 to be spaced in an axial direction of the center axis X1, and a stationary knob 5 formed to be integral with the case 2 is positioned between the rotary knob 3 and the rotary knob 4.

The rotary knob 3 has an operating part 31 formed in a bottomed tubular shape, and a base part 32 positioned in an inner diameter side of the operating part 31. A connecting hole 321 along the center axis X1 is formed in the center of the base part 32. One end part 61a of a first shaft portion 61 in an inner diameter-side rotation transmitting member 6 is fitted in the connecting hole 32 in the axial direction of the center axis X1.

In this state, the first shaft portion 61 and the rotary knob 3 are connected to each other in a state where a relative rotation of each other around the center axis X1 is regulated. When the rotary knob 3 is operated to rotate around the center axis X1, the first shaft portion 61 connected to the rotary knob 3 also is configured to rotate around the center axis X1.

The first shaft portion 61 is connected to a second shaft portion 63 through a flexible shaft 62, and in the embodiment, the inner diameter-side rotation transmitting member 6 comprises the first shaft portion 61, the flexible shaft 62, and the second shaft portion 63.

Here, the flexible shaft 62, and the first shaft portion 61 and the second shaft portion 63 are connected by, for example, press fitting or caulking.

The inner diameter-side rotation transmitting member 6 is bent in a portion of the flexible shaft 62 in the case 2, and in the embodiment, the center axis X1 of the first shaft portion 61 crosses a center axis X2 of the second shaft portion 63 in a predetermined angle θ.

The second shaft portion 63 extends linearly along the center axis X2 inside of a tubular member 71 in a cylindrical shape of an outer diameter-side rotation transmitting member 7 to be described later, and an annular mounting part 101 of an operating rod 10 is mounted to be fitted outside of a tip end part 63a of the second shaft portion 63 projecting from one end part 71a of the tubular member 71.

The operating rod 10 has a leg part 102 extending in a radial direction of the rotational axis X2 from the mounting part 101, and at the time the operating lever 1 is assembled in an unillustrated switch case, an engaging part 102a of the tip end of the leg part 102 is engaged with an operating element of an unillustrated switch.

Therefore when the first shaft portion 61 rotates around the center axis X1 by the rotational operation of the rotary knob 3, the rotation of the first shaft portion 61 is transmitted to the second shaft portion 63 through the flexible shaft 62, thereby rotating the second shaft portion 63 around the center axis X2.

In addition, the rotation of the second shaft portion 63 around the center axis X2 displaces the engaging part 102a of the operating rod 10 in a circumferential direction around the center axis X2, turning on/off the switch engaged with the engaging part 102a.

The rotary knob 4 comprises a ring-shaped operating part 41, a tubular part 42 positioned in an inner diameter side of the operating part 41, and a connecting part 43 connecting the operating part 41 and the tubular part 42, which are integrally formed.

The operating part 41 is rotatably supported by a tubular support part 21a provided in the one end part 21 of the case 2. When the operating part 41 rotates around the center axis X1 by an operation of a user, the tubular part 42 connected to the operating part 41 through the connecting part 43 also rotates around the center axis X1.

The tubular part 42 extends linearly from the inner diameter side of the operating part 41 to the case 2 side (right side in the figure), and the first shaft portion 61 of the aforementioned inner diameter-side rotation transmitting member 6 penetrates inside of the tubular part 42.

One end part 42a of the tubular part 42 is positioned within the case 2, and the tubular part 42 is connected to the tubular member 71 rotatably supported within the case 2 to be capable of transmitting the rotation through the rotation transmitting mechanism 8 to be described later. In the embodiment, the outer diameter-side rotation transmitting member 7 comprises the tubular part 42, the rotation transmitting mechanism 8 and the tubular member 71.

The tubular member 71 extends linearly along the center axis X2, and an annular mounting part 111 of the operating rod 11 is mounted to be fitted outside of the one end part 71a of the tubular member 71 projecting from the other end part 22 of the case 2.

The operating rod 11 has a leg part 112 extending in the radial direction of the rotational axis X2 from the mounting part 111, and when the operating lever 1 is assembled in an unillustrated switch case, an engaging part 112a of the tip end of the leg part 112 is engaged with an operating element of the switch.

Therefore when the tubular part 42 rotates around the center axis X1 by the rotational operation of the rotary knob 4, the rotation of the tubular part 42 is transmitted to the tubular member 71 through the rotation transmitting mechanism 8, thereby rotating the tubular member 71 around the center axis X2.

In addition, the rotation of the tubular member 71 around the center axis X2 displaces the engaging part 112a of the operating rod 11 in the circumferential direction around the center axis X2, turning on/off the switch engaged with the engaging part 112a.

Hereinafter, an explanation will be made of the rotation transmitting mechanism 8.

Figure 2B:
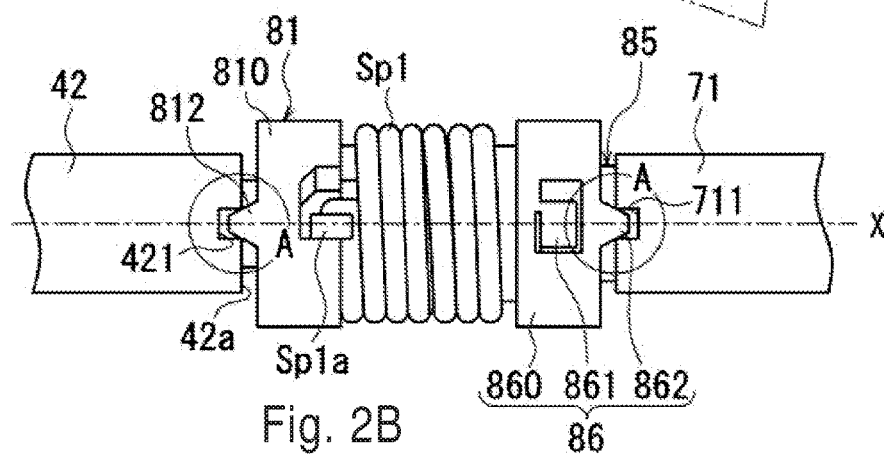
Figure 2C:
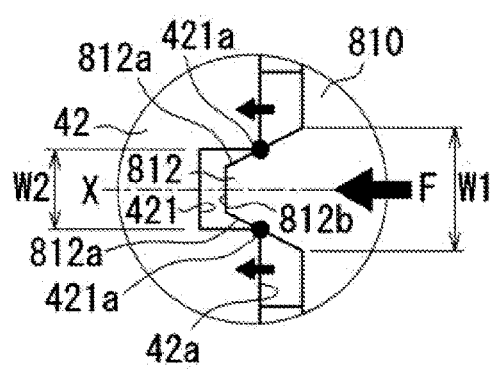
Figure 2D:
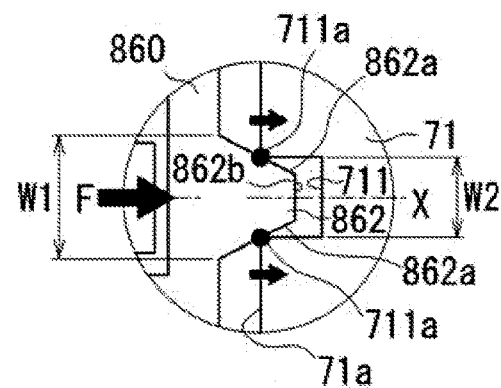

FIGS. 2A to 2D are diagrams explaining the rotation transmitting mechanism 8, wherein FIG. 2A is a perspective view illustrating a state where the rotation transmitting mechanism 8 is inserted outside of the flexible shaft 62 of the inner diameter-side rotation transmitting member 6, FIG. 2B is a plan view thereof, FIG. 2C is an enlarged diagram illustrating Region A in FIG. 2B, and FIG. 2D is an enlarged diagram illustrating Region B in FIG. 2B.

It should be noted that FIGS. 2A to 2D, for the explanation purposes, illustrate the state where the flexible shaft 62 is not bent and the rotation transmitting mechanism 8 is positioned along the center axis X.

Figure 3A:
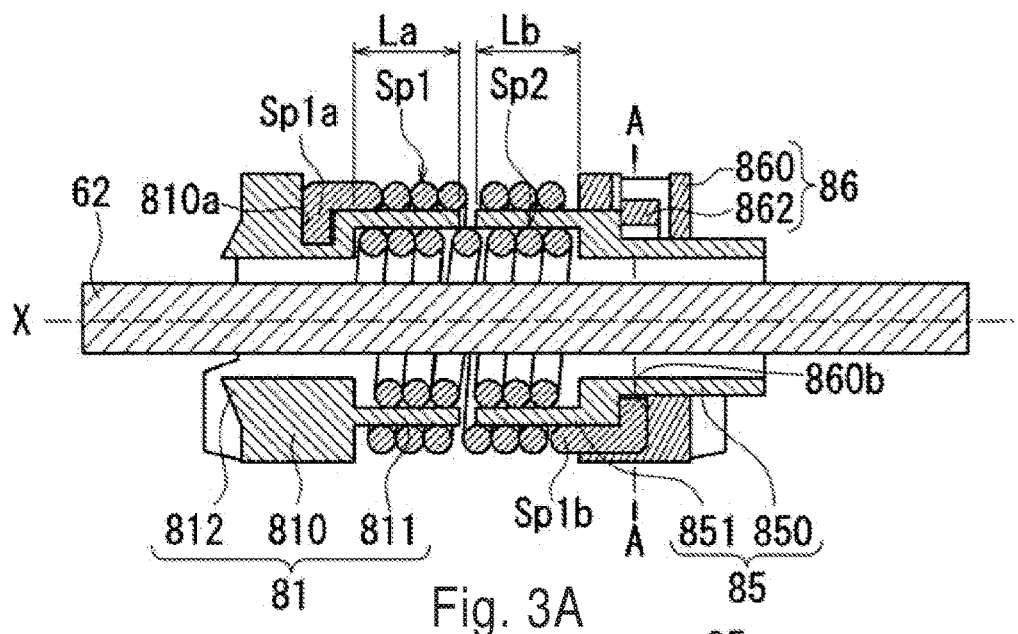
FIGS. 3A, 3B and 3C are diagrams explaining the rotation transmitting mechanism according to the embodiment.
Figure 3B:
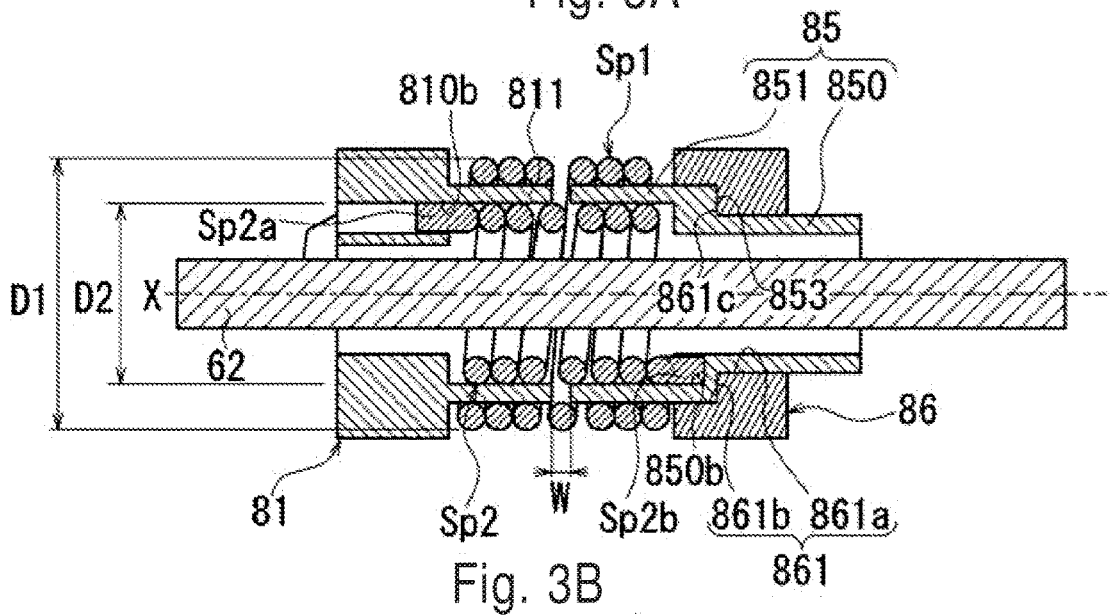
Figure 3C:
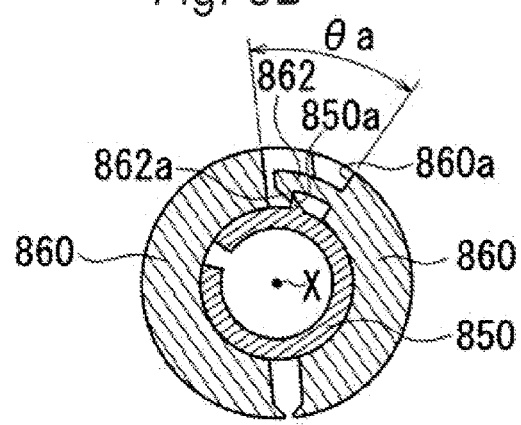
Figure 8A:
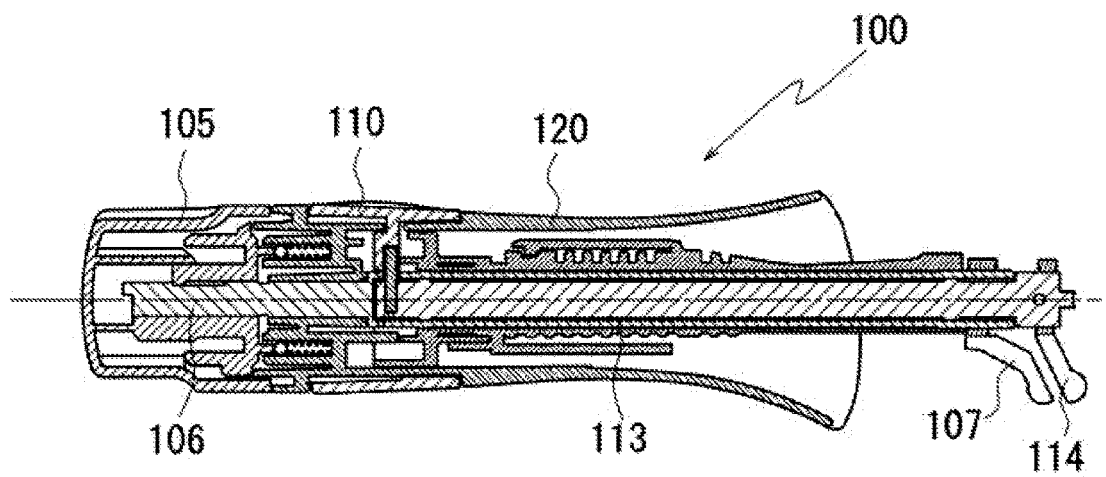
FIGS. 8A and 8B are diagrams explaining an operating lever according to a conventional example.
Figure 8B:
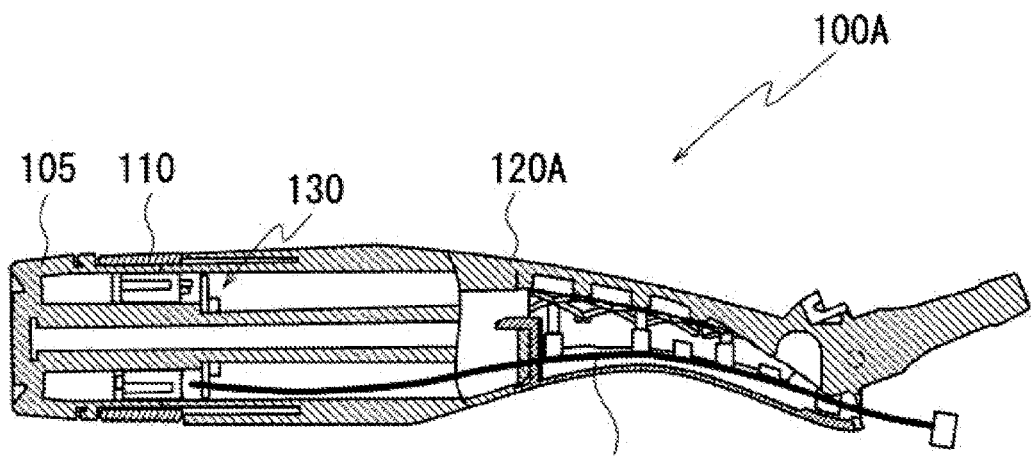

FIGS. 3A, 3B and 3C are diagrams explaining the rotation transmitting mechanism 8, wherein FIG. 3A is a cross section illustrating the rotation transmitting mechanism 8, taken on plane A in FIG. 2A, FIG. 3B is a cross section illustrating the rotation transmitting mechanism 8, taken on plane B in FIG. 2A, and FIG. 3C is a cross section taken on line A-A in FIG. 3A.

FIGS. 4A, 4B and 4C are diagrams explaining the installation of springs (an outer spring Sp1 and inner spring Sp2) of the rotation transmitting mechanism 8, wherein FIG. 4A is a diagram explaining a relation of the springs (the outer spring Sp1 and inner spring Sp2) to a common holder 81, FIG. 4B is a diagram as viewed in the direction of arrows A-A in FIG. 4A, and FIG. 4C is a diagram explaining a relation of the springs (the outer spring Sp1 and inner spring Sp2) to an inner holder 85.

It should be noted that an arrow a in FIG. 4B indicates a winding direction of the springs (the outer spring Sp1 and inner spring Sp2), an arrow b indicates a torsional direction of the outer spring Sp1 and an arrow c indicates a torsional direction of the inner spring Sp2.

In addition, in FIG. 4B, the springs (the outer spring Sp1 and inner spring Sp2) and a tubular wall part 811 are hatched for distinguishing the springs (the outer spring Sp1 and inner spring Sp2) over the tubular wall part 811.

As illustrated in FIGS. 2A to 2D and FIG. 3A, the rotation transmitting mechanism 8 comprises the common holder 81 connected to the tubular part 42 of the rotary knob 4 to be incapable of rotating relative thereto, the outer holder 86 connected to the tubular member 71 to be incapable of rotating relative thereto, and the inner holder 85 provided with a large-diameter tubular part 851 projecting from the inside of the outer holder 86 to the common holder 81 side.

The common holder 81 is provided with a tubular wall part 811 having an outer diameter smaller than that of a ring-shaped base part 810 on an opposing surface of the base part 810 to the inner holder 85, and the tubular wall part 811 is formed in an outer diameter matching with the large-diameter tubular part 851 of the inner holder 85.

The common holder 81 is provided with projections 812 projecting in a direction away from the tubular wall part 811 on an opposite surface of the base part 810 to the tubular wall part 811, and these projections 812 are provided in positions to be symmetrical across the center axis X.

As illustrated in FIG. 2C, the projection 812 is formed in such a shape that a width W1 in the circumferential direction around the center axis X is the narrower according to being the farther from the base part 810 as viewed in the radial direction of the center axis X.

The common holder 81 is provided in such a manner that the projection 812 is engaged with an engaging groove 421 open to one end part 42a of the tubular part 42 from the axial direction of the center axis X, and the engagement of the projection 812 with the engaging groove 421 enables connection of the tubular part 42 and the common holder 81 to be incapable of rotating relative to each other.

Here, as viewed in the radial direction of the center axis X, the engaging part 421 of the tubular part 42 is formed with an equal width W2 along the center axis X, and the width W2 of the engaging groove 421 is formed with a width wider than a width of a tip end part 812b of the projection 812. Therefore corner parts 421a of the engaging part 421 open to the one end part 42a of the tubular part 42 make pressure contact with side edges 812a of the projection 812.

As illustrated in FIG. 3A, the tubular wall part 811 of the common holder 81 has a predetermined length L in the axial direction of the center axis X, and one end part Sp1a side of the outer spring Sp1 is inserted outside of the tubular wall part 811.

The one end part Sp1a of the outer spring Sp1 is fixed to the common holder 81 in a state where a relative rotation between the outer spring Sp1 and the common holder 81 is regulated.

As illustrated in FIG. 3B, one end part Sp2a side of the inner spring Sp2 is inserted inside of the tubular wall part 811, and the one end part Sp2a of the inner spring Sp2 is fixed to the common holder 81 in a state where a relative rotation between the inner spring Sp2 and the common holder 81 is regulated.

In the embodiment, the outer spring Sp1 and the inner spring Sp2 are provided in a direction where the winding direction of the outer spring Sp1 is the same as the winding direction of the inner spring Sp2 (for example, clockwise direction) as viewed in the axial direction of the center axis X, and the inner spring Sp2 has an outer diameter D2 smaller than an outer diameter D1 of the outer spring Sp1.

The other end part Sp2b side of the inner spring Sp2 is inserted inside of the large-diameter tubular part 851 of the inner holder 85 arranged to oppose the common holder 81 on the center axis X, and the other end part Sp2b of the inner spring Sp2 is fixed to the inner holder 85 in a state where a relative rotation between the inner spring Sp2 and the inner holder 85 is regulated.

As illustrated in FIG. 3A, the other end part Sp1b side of the outer spring Sp1 is inserted outside of the large-diameter tubular part 851 of the inner holder 85, and the other end part Sp1b of the outer spring Sp1 is fixed to the outer holder 86 in a state where a relative rotation between the outer spring Sp1 and the outer holder 86 is regulated.

The inner holder 85 has the large-diameter tubular part 851 inside of which the inner spring Sp2 is inserted, and a small-diameter tubular part 850 having an outer diameter smaller than the large-diameter tubular part 851. The large-diameter tubular part 851 has a predetermined length Lb in the axial direction of the center axis X, and the outer holder 86 is mounted to be inserted outside of the small-diameter tubular part 850.

As illustrated in FIG. 3B, the outer holder 86 is provided with a ring-shaped base part 860 as viewed in the axial direction of the center axis X, and a through hole 861 penetrating the center of the base part 860 along the center axis X is formed of a small-diameter hole part 861a matching with the outer diameter of the small-diameter tubular part 850 of the inner holder 85 and a large-diameter hole part 861b matching with the outer diameter of the large-diameter tubular part 851 of the inner holder 85.

The outer holder 86 is inserted outside of the inner holder 85 in a direction where the large-diameter hole part 861b opposes the common holder 81. In the embodiment, in a state of assembling the inner holder 85 and the outer holder 86, a shoulder part 861c of a boundary between the small-diameter hole part 861a and the large-diameter hole part 861b in the inner holder 85 abuts on a shoulder part 853 of a boundary between the large-diameter tubular part 851 and the small-diameter tubular part 850 in the inner holder 85 from the axial direction of the center axis X.

As illustrated in FIGS. 2A and 2B, the base part 860 of the outer holder 86 is provided with projections 862 projecting in a direction away from the common holder 81 on a surface at the opposite side to the common holder 81, and the projections 862 are provided in positions to be symmetrical across the center axis X.

As illustrated in FIG. 2D, the projection 862 is formed in such a shape that a width W1 in the circumferential direction around the center axis X is the narrower according to being the farther from the base part 860 as viewed in the radial direction of the center axis X.

The outer holder 86 is provided in such a manner that the projection 862 is engaged with an engaging groove 711 open to the one end part 71a of the tubular member 71 from the axial direction of the center axis X, and the engagement of the projection 862 with the engaging groove 711 enables connection of the tubular member 71 and the outer holder 86 to be incapable of rotating relative to each other.

Here, as viewed in the radial direction of the center axis X, the engaging groove 711 of the tubular member 71 is formed with an equal width W2 along the center axis X, and the width W2 of the engaging groove 711 is formed with a width wider than a width of a tip end part 862b of the projection 862. Therefore corner parts 711a of the engaging groove 711 open to the one end part 71a of the tubular member 71 make pressure contact with side edges 862a of the projection 862.

As illustrated in FIG. 3C, the base part 860 of the outer holder 86 is provided with an opening part 860a in a part of the small-diameter hole part 861a to expose the small-diameter tubular part 850 of the inner holder 85. The opening part 860a is formed in a length corresponding to a predetermined angular range θa in the circumferential direction around the center axis X, and an engaging projection 850a provided on the outer periphery of the small-diameter tubular part 850 is exposed within the opening part 860a.

The base part 860 of the outer holder 86 is provided with an engaging arm part 863 projecting into the opening part 860a. The engaging arm part 863 is formed to project in the circumferential direction around the center axis X, and a stop part 863a provided in a tip end of the engaging arm part 863 is engaged with the engaging projection 850a provided on the outer periphery of the small-diameter tubular part 850.

In this state, the outer holder 86 and the inner holder 85 are connected to each other in a state where a relative rotation in the circumferential direction of the center axis X therebetween is regulated.

Here, an explanation will be made of an assembling state of the outer spring Sp1 and the inner spring Sp2 in the rotation transmitting mechanism 8.

As illustrated in FIGS. 3A and 3B, one end part Sp1a of the outer spring Sp1 and one end part Sp2a of the inner spring Sp2 are supported by the common holder 81. In addition, the outer holder 86 connected to the other end part Sp1b of the outer spring Sp1 and the inner holder 85 connected to the other end part Sp2b of the inner spring Sp2 are rotatable relative to each other around the center axis X in a state before the stop part 862a of the outer holder 86 is engaged with the engaging projection 850a of the inner holder 85.

Here, as illustrated in FIGS. 4A and 4B, when the outer holder 86 is rotated in a counterclockwise direction in the circumferential direction around the center axis X as viewed in the direction of arrows A-A in FIG. 4A, the outer spring Sp1 the other end part Sp1b of which is fixed to the outer holder 86 is twisted in the counterclockwise direction in the circumferential direction around the center axis X (refer to a sign b in FIG. 4B).

In a case where the twist in this direction is in a direction of winding and tightening the outer spring Sp1 (direction of reducing an outer diameter of the outer spring Sp1), the outer spring Sp1 makes pressure contact with the outer periphery of the tubular wall part 811 of the common holder 81 (refer to a sign b1 in FIG. 4A).

It should be noted that in this case, the other end part Sp1b side of the outer spring Sp1 inserted outside of the large-diameter tubular part 851 of the inner holder 85 also makes pressure contact with the outer periphery of the large-diameter tubular part 851 (refer to a sign b1 in FIG. 4C).

Here, in the embodiment, since the winding direction of the outer spring Sp1 is the same as the winding direction of the inner spring Sp2, when the inner spring Sp2 is twisted in a clockwise direction in the circumferential direction around the center axis X as viewed in the direction of arrows A-A in FIG. 4A (refer to a sign c in FIGS. 4A and 4B), the twist in this direction is in a direction of winding and widening the inner spring Sp2 (direction of increasing an outer diameter of the inner spring Sp2).

Therefore the inner spring Sp2 makes pressure contact with the inner periphery of the tubular wall part 811 of the common holder 81 (refer to a sign c1 in FIG. 4A).

It should be noted that also in this case, the other end part Sp2b side of the inner spring Sp2 inserted inside of the large-diameter tubular part 851 of the inner holder 85 makes pressure contact with the inner periphery of the large-diameter tubular part 851 (refer to a sign c1 in FIG. 4C).

In the embodiment, the angular position of the outer holder 86 around the center axis X is arranged in the angular position where the torsional stress of causing the inner periphery of the outer spring Sp1 to make pressure contact with the tubular wall part 811 of the common holder 81 and the large-diameter tubular part 851 of the inner holder 85 acts on the outer spring Sp1, the angular position of the inner holder 85 around the center axis X is arranged in the angular position where the torsional stress of causing the outer periphery of the inner spring Sp2 to make pressure contact with the tubular wall part 811 of the common holder 81 and the large-diameter tubular part 851 of the inner holder 85 acts on the inner spring Sp2, and in a state where the stop part 863a of the outer holder 86 is engaged with the engaging projection 850a of the inner holder 85 to regulate a relative rotation of the outer holder 86 and the inner holder 85 around the center axis X, the outer holder 86 and the inner holder 85 are connected.

Here, when the common holder 81 connected to the tubular part 42 rotates in the clockwise direction in the circumferential direction around the center axis X as viewed in the direction of arrows A-A in FIG. 4A by an operation of the rotary knob 4, the outer holder 86 and the inner holder 85 rotate in a counterclockwise direction relative to the common holder 81.

With this relative rotation, since the outer spring Sp1 makes pressure contact with the outer periphery of each of the tubular wall part 811 and the large-diameter tubular part 851 of the inner holder 85, the rotation of the common holder 81 is transmitted through the outer spring Sp1 to the inner holder 85 and the outer holder 86 connected to be incapable of rotating relative to each other.

In addition, when the common holder 81 rotates in a counterclockwise direction in the circumferential direction around the center axis X as viewed in the direction of arrows A-A in FIG. 4A, the outer holder 86 and the inner holder 85 rotate in a clockwise direction relative to the common holder 81.

With this relative rotation, since the inner spring Sp2 makes pressure contact with the inner periphery of each of the tubular wall part 811 and the large-diameter tubular part 851 of the inner holder 85, the rotation of the common holder 81 is transmitted through the inner spring Sp2 to the inner holder 85 and the outer holder 86 connected to be incapable of rotating relative to each other.

Accordingly even in a case where the common holder 81 rotates in any of the clockwise direction and the counterclockwise direction, the rotation input to the common holder 81 is quickly transmitted through any of the outer spring Sp1 and the inner spring Sp2 to the inner holder 85 and the outer holder 86 connected to be incapable of rotating relative to each other, and thereafter, is finally transmitted to the tubular member 71 to which the outer holder 86 is connected to be incapable of rotating relative thereto.

Here, in the embodiment, the tubular wall part 811 of the common holder 81 and the large-diameter tubular part 851 of the inner holder 85 are arranged to oppose to each other by an interval W in the axial direction of the center axis X (refer to FIG. 3B). Therefore the rotation transmitting mechanism 8 can be bent in the halfway position of the outer spring Sp1 and the inner spring Sp2 in the longitudinal direction within a range where the tubular wall part 811 and the large-diameter tubular part 851 do not interfere with each other.

Therefore in a case where the rotation transmitting mechanism 8 is inserted outside of the flexible shaft 62 connecting the first shaft portion 61 rotating around the center axis X1 and the second shaft portion 63 rotating around the center axis X2 crossing the center axis X1 in a predetermined angle to be rotatable integrally, and the tubular part 42 inserted outside of the first shaft portion 61 and the tubular member 71 inserted outside of the second shaft portion 63 are connected by the rotation transmitting mechanism 8, the rotation transmitting mechanism 8 also can be bent. Therefore the rotation transmission between the tubular part 42 and the tubular member 71 can be performed through the rotation transmitting mechanism 8.

As described above, according to the embodiment,
(1) The rotation transmitting mechanism 8 that is inserted outside of the flexible shaft 62 for connecting the first shaft portion 61 rotating around the center axis X1 and the second shaft portion 3 rotating around the center axis X2 crossing the center axis X1 in a predetermined angle to be rotatable integrally and connects the tubular part 42 inserted outside of the first shaft portion 61 and the tubular member 71 inserted outside of the second shaft portion 63 for rotation transmission, the rotation transmitting mechanism 8 comprising:

the common holder 81 (first tubular holder) connected to the tubular part 42 (first tubular member) to be incapable of rotating relative thereto;

the outer holder 86 (second tubular holder) connected to the tubular member 71 (second tubular member) to be incapable of rotating relative thereto;

the inner holder 85 (third tubular holder) having the large-diameter tubular part 851 provided to project from an inside of the outer holder 86 to the common holder 81 side and connected to the outer holder 86 to be incapable of rotating relative thereto;

the inner spring Sp2 (inner coil spring) having one end part Sp2a side and the other end part Sp2b side in the longitudinal direction that are inserted in the common holder 81 and the inner holder 85, the one end part Sp2a and the other end part Sp2b being respectively fixed to the common holder 81 and the inner holder 85; and the outer spring Sp1 (outer coil spring) having one end part Sp1a and the other end part Sp1b in the longitudinal direction that are inserted outside of the common holder 81 and the inner holder 85, the one end part Sp1a and the other end part Sp1b being respectively fixed to the common holder 81 and the outer holder 86, wherein the winding direction of the inner spring Sp2 is the same as that of the outer spring Sp1, and in a state where the angular position of the outer holder 86 around the center axis X is arranged in the angular position where the torsional stress of causing the inner periphery of the outer spring Sp1 to come into pressure contact with the tubular wall part 811 of the common holder 81 and the large-diameter tubular part 851 of the inner holder 85 acts on the outer spring Sp1, and the angular position of the inner holder 85 around the center axis X is arranged in the angular position where the torsional stress of causing the outer periphery of the inner spring Sp2 to come into pressure contact with the tubular wall part 811 of the common holder 81 and the large-diameter tubular part 851 of the inner holder 85 acts on the inner spring Sp2, the inner holder 85 and the outer holder 86 are connected to be incapable of rotating relative to each other.

With this configuration, the inner periphery of the outer spring Sp1 is in pressure contact with the tubular wall part 811 of the common holder 81 and the large-diameter tubular part 851 of the inner holder 85, and the outer periphery of the inner spring Sp2 is in pressure contact with the tubular wall part 811 of the common holder 81 and the large-diameter tubular part 851 of the inner holder 85.

Therefore in a case where the rotation input to the common holder 81 rotates the common holder 81 either in the clockwise direction or in the counterclockwise direction in the circumferential direction around the rotary as viewed in the direction of arrows A-A in FIG. 4A, the rotation input from the tubular part 42 to the common holder 81 is quickly transmitted through any of the outer spring Sp1 and the inner spring Sp2 to the outer holder 86 or the inner holder 85 connected to be incapable of rotating relatively.

As a result, the rotation input from the tubular part 42 to the common holder 81 by the rotary operation of the rotary knob 4 is finally transmitted from the outer holder 86 to the tubular member 71.

Here, since the outer spring Sp1 and the inner spring Sp2 can curve halfway in the longitudinal direction, the rotation transmitting mechanism 8 can be provided inside the case 2 of the curved outer appearance to be used for rotation transmission of the rotary knob 4.

Further, even in a case of adopting the case 2 with the curved outer appearance, since the rotation of the rotary knob can be transmitted without providing the harness, it is possible to suppress an increase in manufacturing costs of the operating lever 1.

Particularly, when the outer holder 86 and the inner holder 85 are connected to be incapable of rotating relative to each other, the outer spring Sp1 and the inner spring Sp2 are retained in a state of being subjected to torsional stress.

Therefore since a rotational force in a direction of eliminating the torsional stress acting on the outer spring Sp1 and the inner spring Sp2 acts, in a case where one end part Sp1a and the other end part Sp1b of the outer spring Sp1 are supported by the common holder 81 and the outer holder 86 with a little play or in a case where one end part Sp2a and the other end part Sp2b of the inner spring Sp2 are supported by the common holder 81 and the inner holder 85 with a little play, the rotational force in the direction of eliminating the torsional stress can suppress rattling of the outer spring Sp1 and the inner spring Sp2.

As a result, it is possible to widen an inner diameter of each of the engaging holes 810a, 860c of the common holder 81 and the outer holder 86 with the one end part Sp1a and the other end part Sp1b of the outer spring Sp1 and an inner diameter of each of the engaging holes 810b, 850b of the common holder 81 and the inner holder 85 with the one end part Sp2a and the other end part Sp2b of the inner spring Sp2. Therefore, an improvement on assembling properties of the outer spring Sp1 and the inner spring Sp2 can be expected.

Further, since it is possible to suppress the rattling of the outer spring Sp1 and the inner spring Sp2, a transmission loss of the rotation from the common holder 81 side to the outer holder 86 side can be reduced. Therefore it is possible to reduce the transmission loss at the time of transmitting the rotation of the tubular part 42 by the operation of the rotary knob 4 to the tubular member 71 through the rotation transmitting mechanism 8.

In addition, since the torsional direction of the outer spring Sp1 is in reverse to the torsional direction of the inner spring Sp2, an effective torsion spring constant becomes large, thus making it possible to reduce the transmission loss in the rotation transmission through the rotation transmitting mechanism 8.

Particularly the inner periphery of the outer spring Sp1 is in pressure contact with the tubular wall part 811 of the common holder 81 and the large-diameter tubular part 851 of the inner holder 85, and the outer periphery of the inner spring Sp2 is in pressure contact with the tubular wall part 811 of the common holder 81 and the large-diameter tubular part 851 of the inner holder 85. Since the effective torsion spring constant becomes larger, even in a case where the slide resistance becomes large unexpectedly due to abnormal abrasion of movable components of the switch or the like, it is possible to suppress the transmission loss within a range of no impact on the performance.

Further, the member with which the outer spring Sp1 and the inner spring Sp2 make pressure contact comprises the tubular wall part 811 of the common holder 81 and the large-diameter tubular part 851 of the inner holder 85. Here, the tubular wall part 811 has an outer diameter smaller than that of the base part 810 in the common holder 81, and the large-diameter tubular part 851 has an outer diameter smaller than that of the outer holder 86 inserted outside of the inner holder 85. Therefore there is no possibility that an outer diameter of the operating lever 1 becomes large in a region where the rotation transmitting mechanism 8 is provided, due to providing the outer spring Sp1 and the inner spring Sp2.

In addition, the member with which the outer spring Sp1 and the inner spring Sp2 make pressure contact comprises the tubular wall part 811 of the common holder 81 and the large-diameter tubular part 851 of the inner holder 85, and does not comprise two walls (the inner tubular wall part 813 and outer tubular wall part 814 or the large-diameter tubular part 851 and tubular wall part 864) arranged to be spaced radially therebetween as in a case of the rotation transmitting mechanism 8 (refer to FIGS. 5A to 5C) according to a modification to be described later.

Accordingly, since the member with which the outer spring Sp1 and the inner spring Sp2 make pressure contact does not comprise the two walls arranged to be spaced radially therebetween, there is no possibility that the outer diameter of the operating lever 1 becomes large in a region where the rotation transmitting mechanism 8 is provided, due to the reduced numbers of the walls.

(2) In a state where the center axis of the common holder 81 is in conformity with the center axis of the inner holder 85, the common holder 81 and the inner holder 85 are provided in a positional relation in which a gap W can be produced between the tubular wall part 811 of the common holder 81 and the large-diameter tubular part 851 of the inner holder 85.

With this configuration, the rotation transmitting mechanism 8 can be curved to adjust to the outer appearance of the case 2 without interference between the tubular wall part 811 of the common holder 81 and the large-diameter tubular part 851 of the inner holder 85.

(3) The outer holder 86 comprises the opening part 860a exposing the outer periphery of the small-diameter tubular part 850 of the inner holder 85 in the length corresponding to the predetermined angular range θa in the circumferential direction around the center axis X, and the engaging arm part 863 extending in the circumferential direction within the opening part 860a, the engaging projection 850a with which the stop part 862a of the engaging arm part 863 is engaged is provided on the outer periphery of the small-diameter tubular part 850 of the inner holder 85 in a region positioned within the opening part 860a, and the stop part 862a of the engaging arm part 863 in the outer holder 86 is engaged with the engaging projection 850a of the inner holder 85 to connect the inner holder 85 and the outer holder 86 to be incapable of rotating relative to each other.

With this configuration, the inner holder 85 and the outer holder 86 can be simply connected to be incapable of rotating relative to each other.

It should be noted that the method for connecting the inner holder 85 and the outer holder 86 to be incapable of rotating relative to each other is not limited to the mode of engaging the stop part 863a with the engaging projection 850a, but, may be connected to be incapable of rotating relative to each other, for example, using dowel pins (made of resin or metal).

(4) The common holder 81 has the projection 812 projecting to the tubular part 42 side along the center axis X, the tubular part 42 has the engaging groove (recessed groove) 421 with which the projection 812 of the common holder 81 is engaged, and the outer holder 86 has the projection 862 projecting to the tubular member 71 side.

In addition, the tubular member 71 has the engaging groove 711 (recessed groove) with which the projection 862 of the outer holder 86 is engaged, the projection 812 of the common holder 81 and the projection 862 of the outer holder 86 each are formed in such a manner that a width W1 in the circumferential direction around the center axis X is the narrower according to being closer to the tip end side, and the width of the tip end part of each is set to be narrower than a width W2 in the circumferential direction around the center axis X of each of the engaging groove 421 of the common holder 81 and the engaging groove 711 of the outer holder 86.

Since the common holder 81 and the outer holder 86 are provided in a state where the springs (outer spring Sp1 and the inner spring Sp2) interposed therebetween are compressed, the common holder 81 and the outer holder 86 are respectively urged toward the tubular part 42 side and the tubular member 71 side.

Therefore with the configuration as described above, the side edges 812a of the projection 812 in the common holder 81 can be made to be in pressure contact with the corner parts 421a of the engaging groove 421 open to the one end part 42a of the tubular part 42, and the side edges 862a of the projection 862 in the outer holder 86 can be made to be in pressure contact with the corner parts 711a of the engaging groove 711 open to the one end part 71a of the tubular member 71. Therefore the common holder 81 and the tubular part 42, and the outer holder 86 and the tubular member 71 are respectively connected with no rattling to be incapable of rotating relative to each other.

In addition, the connection without the rattling or relative rotation therebetween can appropriately suppress the loss of the rotation transmission between the common holder 81 and the tubular part 42, and between the outer holder 86 and the tubular member 71.

It should be noted that the embodiment has exemplified the case where the common holder 81 and the outer holder 86 are respectively provided with the projections 816, 862, but the present invention may be configured such that the common holder 81 and the outer holder 86 are respectively provided with engaging grooves, and the tubular part 42 and the tubular member 71 are respectively provided with projections.

Hereinafter, an explanation will be made of modifications of a rotation transmitting mechanism 8.

FIG. 5A to FIG. 7C are diagrams explaining the installation of springs (outer spring Sp1 and inner spring Sp2) in the rotation transmitting mechanism according to the modification. Each of FIG. 5A, FIG. 6A and FIG. 7A is a diagram explaining a relation of the springs (outer spring Sp1 and inner spring Sp2) to the common holder 81, each of FIG. 5B, FIG. 6B and FIG. 7B is a diagram as viewed in the direction of arrows A-A in each of FIG. 5A, FIG. 6A and FIG. 7A, and each of FIG. 5C, FIG. 6C and FIG. 7C is a diagram explaining a relation of the springs (outer spring Sp1 and inner spring Sp2) to the inner holder 85 and the outer holder 86.

Here, in the modification illustrated in FIGS. 5A to 5C, since the winding direction of the outer spring Sp1 is the same as the winding direction of the inner spring Sp2, the winding direction of the outer spring Sp1 and the winding direction of the inner spring Sp2 are indicated at an arrow a.

In addition, in the modification illustrated in FIGS. 6A to 7C, since the winding direction of the outer spring Sp1 is in reverse to the winding direction of the inner spring Sp2, illustration of arrows indicative of the winding direction of the outer spring Sp1 and the winding direction of the inner spring Sp2 is omitted.

It should be noted that in FIG. 5A to 7C, as similar to FIGS. 4A to 4C, the torsional direction of the outer spring Sp1 is indicative of an arrow b, and the torsional direction of the inner spring Sp2 is indicative of an arrow c.

The aforementioned embodiment has exemplified the case where the outer spring Sp1 is provided to be inserted outside of the tubular wall part 811 of the common holder 81 and the large-diameter tubular part 851 of the inner holder 85, and the inner spring Sp2 is provided to be inserted inside of the tubular wall part 811 of the common holder 81 and the large-diameter tubular part 851 of the inner holder 85.

The installation mode of the outer spring Sp1 and the inner spring Sp2 can be changed as needed within a range where the rotation input to the common holder 81 can be finally transmitted to the outer sprung Sp1 through the outer spring Sp1 or the inner spring Sp2.

For example, the common holder 81 has two tubular wall parts comprising an inner tubular wall part 813, and an outer tubular wall part 814 surrounding the outer periphery of the inner tubular wall part 813 by a predetermined interval, and in a case where the outer holder 86 has a tubular wall part 864 surrounding the outer periphery of the large-diameter tubular part 855 of the inner holder 85 by a predetermined interval, the following configuration makes it possible to achieve the operational effect as similar to that of the aforementioned embodiment.

Specifically as illustrated in FIGS. 5A to 5C, in a case where in the base part 810 of the common holder 81, the inner tubular wall part 813 is provided in a position along the inner periphery 810a of the base part 810 and the outer tubular wall part 814 is provided in a position along the outer periphery 810b of the base part 810, (a) the outer spring Sp1 is inserted inside of the outer tubular wall part 814 of the common holder 81 and the tubular wall part 864 of the outer holder 86, and then, the outer spring Sp1 is fixed to the common holder 81 and the outer holder 86 respectively, (b) the inner spring Sp2 is inserted outside of the inner tubular wall part 813 of the common holder 81 and the large-diameter tubular part 855 of the inner holder 85, and then, the inner spring Sp2 is fixed to the common holder 81 and the inner holder 85 respectively, (c) the winding direction of the outer spring Sp1 is the same as that of the inner spring Sp2, and (d) in a state where the angular position of the outer holder 86 around the center axis X is arranged in the angular position where the torsional stress of causing the outer periphery of the outer spring Sp1 to come into pressure contact with the outer tubular wall part 814 of the common holder 81 and the tubular wall part 864 of the outer holder 86 acts on the outer spring Sp1, and the angular position of the inner holder 85 around the center axis X is arranged in the angular position where the torsional stress of causing the inner periphery of the inner spring Sp2 to come into pressure contact with the inner tubular wall part 813 of the common holder 81 and the large-diameter tubular part 855 of the inner holder 85 acts on the inner spring Sp2, the inner holder 85 and the outer holder 86 are connected to be incapable of rotating relatively while regulating the relative rotation around the center axis X of the outer holder 86 and the inner holder 85.

In a case of this configuration, as illustrated in FIGS. 5A and 5B, when the outer holder 86 is rotated in the clockwise direction in the circumferential direction around the center axis X as viewed in the direction of arrows A-A in FIG. 5A, the outer spring Sp1 the other end part Sp1b of which is fixed to the outer holder 86 is twisted in the clockwise direction in the circumferential direction around the center axis X (refer to a sign b in FIG. 5B).

In a case where the twist in this direction is in a direction of winding and widening the outer spring Sp1 (direction of increasing the outer diameter of the outer spring Sp1), the outer spring Sp1 makes pressure contact with the inner periphery of each of the outer tubular wall part 814 of the common holder 81 and the tubular wall part 864 of the outer holder 86 (refer to a sign c1 in FIGS. 5A and 5C).

In addition, since the winding direction of the outer spring Sp1 is the same as the winding direction of the inner spring Sp2 in the embodiment, when, as viewed in the direction of arrows A-A in FIG. 5A, the inner holder 85 is rotated in the counterclockwise direction around the center axis X to twist the inner spring Sp2 in the counterclockwise direction (refer to a sign c in FIGS. 5A and 5B), the twist in this direction is in a direction of winding and contracting the inner spring Sp2 (direction of reducing the outer diameter of the inner spring Sp2).

Therefore the inner spring Sp2 makes pressure contact with the outer periphery of the inner tubular wall part 813 of the common holder 81 and the large-diameter tubular part 855 of the inner holder 85 (refer to a sign b1 in FIGS. 5A and 5C).

Therefore in the rotation transmitting mechanism according to the modification in FIGS. 5A to 5C, the outer spring Sp1 makes pressure contact with the inner periphery of each of the outer tubular wall part 814 of the common holder 81 and the tubular wall part 864 of the outer holder 86, and the inner spring Sp2 makes pressure contact with the outer periphery of each of the inner tubular wall part 813 of the common holder 81 and the large-diameter tubular part 855 of the inner holder 85. In this state, the inner holder 85 and the outer holder 86 are connected to be incapable of rotating relative to each other.

As a result, when the common holder 81 connected to the tubular part 42 rotates in the clockwise direction in the circumferential direction around the center axis X as viewed in the direction of arrows A-A in FIG. 5A by an operation of the rotary knob 4, the outer holder 86 and the inner holder 85 rotate in the counterclockwise direction relative to the common holder 81.

Then, since the inner spring Sp2 makes pressure contact with the outer periphery of each of the inner tubular wall part 813 of the common holder 81 and the large-diameter tubular part 855 of the inner holder 85, the rotation of the common holder 81 is transmitted to the inner holder 85 and the outer holder 86 connected to be incapable of rotating relative to each other through the inner spring Sp2 making pressure contact with the outer periphery of each of the inner tubular wall part 813 of the common holder 81 and the large-diameter tubular part 855 of the inner holder 85.

In addition, when the common holder 81 rotates in the counterclockwise direction in the circumferential direction around the center axis X as viewed in the direction of arrows A-A in FIG. 5A, the outer holder 86 and the inner holder 85 rotate in the clockwise direction relative to the common holder 81.

Then, since the outer spring Sp1 makes pressure contact with the inner periphery of each of the outer tubular wall part 814 of the common holder 81 and the tubular wall part 864 of the outer holder 86, the rotation of the common holder 81 is transmitted to the inner holder 85 and the outer holder 86 connected to be incapable of rotating relative to each other through the outer spring Sp1 making pressure contact with the inner periphery of each of the outer tubular wall part 814 of the common holder 81 and the tubular wall part 864 of the outer holder 86.

Accordingly even in a case where the common holder 81 rotates in any of the clockwise direction and the counterclockwise direction as viewed in the direction of arrows A-A in FIG. 5A, the rotation input to the common holder 81 is transmitted to the inner holder 85 and the outer holder 86 connected to be incapable of rotating relative to each other through any of the outer spring Sp1 and the inner spring Sp2.

In addition, as illustrated in FIGS. 6A to 6C, in a case where in the base part 810 of the common holder 81, the inner tubular wall part 813 is provided in a position offset in a radial outside from the inner periphery 810a of the base part 810 and the outer tubular wall part 814 is provided in a position along the outer periphery 810b of the base part 810, (a) the outer spring Sp1 is inserted inside of the outer tubular wall part 814 of the common holder 81 and the tubular wall part 864 of the outer holder 86, and then, the outer spring Sp1 is fixed to the common holder 81 and the outer holder 86 respectively, (b) the inner spring Sp2 is inserted inside of the inner tubular wall part 813 of the common holder 81 and the large-diameter tubular part 855 of the inner holder 85, and then, the inner spring Sp2 is fixed to the common holder 81 and the inner holder 85 respectively, (c) the winding direction of the outer spring Sp1 is in reverse to that of the inner spring Sp2, and (d) the angular position of the outer holder 86 around the center axis X is arranged in the angular position where the torsional stress of causing the outer periphery of the outer spring Sp1 to come into pressure contact with the outer tubular wall part 864 of the common holder 81 and the tubular wall part 864 of the outer holder 86 acts on the outer spring Sp1, and the angular position of the inner holder 85 around the center axis X is arranged in the angular position where the torsional stress of causing the outer periphery of the inner spring Sp2 to come into pressure contact with the inner tubular wall part 813 of the common holder 81 and the large-diameter tubular part 855 of the inner holder 85 acts on the inner spring Sp2. In this state, the inner holder 85 and the outer holder 86 are connected while regulating the relative rotation around the center axis X of the outer holder 86 and the inner holder 85.

In a case of this configuration, as illustrated in FIGS. 6A and 6B, when the outer holder 86 is rotated in the counterclockwise direction in the circumferential direction around the center axis X as viewed in the direction of arrows A-A in FIG. 6A, the outer spring Sp1 the other end part Sp1b of which is fixed to the outer holder 86 is twisted in the counterclockwise direction in the circumferential direction around the center axis X (refer to a sign b in FIG. 6B).

In a case where the twist in this direction is in a direction of winding and widening the outer spring Sp1 (direction of increasing the outer diameter of the outer spring Sp1), the outer spring Sp1 makes pressure contact with the inner periphery of each of the outer tubular wall part 814 of the common holder 81 and the tubular wall part 864 of the outer holder 86 (refer to a sign c1 in FIGS. 6A and 6C).

In addition, since the winding direction of the outer spring Sp1 is in reverse to the winding direction of the inner spring Sp2 in the embodiment, when, as viewed in the direction of arrows A-A in FIG. 6A, the inner holder 85 is rotated in the clockwise direction around the center axis X to twist the inner spring Sp2 in the clockwise direction (refer to a sign c in FIGS. 6A and 6B), the twist in this direction is in a direction of winding and widening the inner spring Sp2 (direction of increasing the outer diameter of the inner spring Sp2).

Therefore the inner spring Sp2 makes pressure contact with the inner periphery of each of the inner tubular wall part 813 of the common holder 81 and the large-diameter tubular part 855 of the inner holder 85 (refer to a sign b1 in FIGS. 6A and 6C).

Therefore in the rotation transmitting mechanism according to the modification in FIGS. 6A to 6C, the outer spring Sp1 makes pressure contact with the inner periphery of each of the outer tubular wall part 814 of the common holder 81 and the tubular wall part 864 of the outer holder 86, and the inner spring Sp2 makes pressure contact with the inner periphery of each of the inner tubular wall part 813 of the common holder 81 and the large-diameter tubular part 855 of the inner holder 85. In this state, the inner holder 85 and the outer holder 86 are connected to be incapable of rotating relative to each other.

As a result, when the common holder 81 connected to the tubular part 42 rotates in the clockwise direction in the circumferential direction around the center axis X as viewed in the direction of arrows A-A in FIG. 6A by the operation of the rotary knob 4, the outer holder 86 and the inner holder 85 rotate in the counterclockwise direction relative to the common holder 81.

Then, since the outer spring Sp1 makes pressure contact with the inner periphery of each of the outer tubular wall part 814 of the common holder 81 and the tubular wall part 864 of the outer holder 86, the rotation of the common holder 81 is transmitted to the inner holder 85 and the outer holder 86 connected to be incapable of rotating relative to each other through the outer spring Sp1 making pressure contact with the inner periphery of each of the outer tubular wall part 814 of the common holder 81 and the tubular wall part 864 of the outer holder 86.

In addition, when the common holder 81 rotates in a counterclockwise direction in the circumferential direction around the center axis X as viewed in the direction of arrows A-A in FIG. 6A, the outer holder 86 and the inner holder 85 rotate in the clockwise direction relative to the common holder 81.

Then, since the inner spring Sp2 makes pressure contact with the inner periphery of each of the inner tubular wall part 813 of the common holder 81 and the large-diameter tubular part 855 of the inner holder 85, the rotation of the common holder 81 is transmitted to the inner holder 85 and the outer holder 86 connected to be incapable of rotating relative to each other through the inner spring Sp2 making pressure contact with the inner periphery of each of the inner tubular wall part 813 of the common holder 81 and the large-diameter tubular part 855 of the inner holder 85.

Accordingly even in a case where the common holder 81 rotates in any of the clockwise direction and the counterclockwise direction as viewed in the direction of arrows A-A in FIG. 6A, the rotation of the common holder 81 is transmitted to the inner holder 85 and the outer holder 86 connected to be incapable of rotating relative to each other through any of the outer spring Sp1 and the inner spring Sp2.

In addition, as illustrated in FIGS. 7A to 7C, in a case where in the base part 810 of the common holder 81, the inner tubular wall part 813 is provided in a position along the inner periphery 810a of the base part 810 and the outer tubular wall part 814 is provided in a position offset in a radial inside from the outer periphery 810b of the base part 810, (a) the outer spring Sp1 is inserted outside of the outer tubular wall part 814 of the common holder 81 and the tubular wall part 864 of the outer holder 86, and then, the outer spring Sp1 is fixed to the common holder 81 and the outer holder 86 respectively, (b) the inner spring Sp2 is inserted outside of the inner tubular wall part 813 of the common holder 81 and the large-diameter tubular part 855 of the inner holder 85, and then, the inner spring Sp2 is fixed to the common holder 81 and the inner holder 85 respectively, (c) the winding direction of the outer spring Sp1 is in reverse to that of the inner spring Sp2, and (d) the angular position of the outer holder 86 around the center axis X is arranged in the angular position where the torsional stress of causing the inner periphery of the outer spring Sp1 to come into pressure contact with the outer tubular wall part 814 of the common holder 81 and the tubular wall part 864 of the outer holder 86 acts on the outer spring Sp1, and the angular position of the inner holder 85 around the center axis X is arranged in the angular position where the torsional stress of causing the inner periphery of the inner spring Sp2 to come into pressure contact with the inner tubular wall part 813 of the common holder 81 and the large-diameter tubular part 855 of the inner holder 85 acts on the inner spring Sp2. In this state, the inner holder 85 and the outer holder 86 are connected while regulating the relative rotation around the center axis X of the outer holder 86 and the inner holder 85.

In a case of this configuration, as illustrated in FIGS. 7A and 7B, when the outer holder 86 is rotated in the clockwise direction in the circumferential direction around the center axis X as viewed in the direction of arrows A-A in FIG. 7A, the outer spring Sp1 the other end part Sp1b of which is fixed to the outer holder 86 is twisted in the clockwise direction in the circumferential direction around the center axis X (refer to a sign b in FIG. 7B).

In a case where the twist in this direction is in a direction of winding and contracting the outer spring Sp1 (direction of reducing the outer diameter of the outer spring Sp1), the outer spring Sp1 makes pressure contact with the outer periphery of each of the outer tubular wall part 814 of the common holder 81 and the tubular wall part 864 of the outer holder 86 (refer to a sign c1 in FIGS. 6A and 6C).

In addition, since the winding direction of the outer spring Sp1 is in reverse to the winding direction of the inner spring Sp2 in the embodiment, when, as viewed in the direction of arrows A-A in FIG. 7A, the inner holder 85 is twisted in the counterclockwise direction in the circumferential direction around the center axis X (refer to a sign c in FIGS. 7A and 7B), the twist in this direction is in a direction of winding and contracting the inner spring Sp2 (direction of reducing the outer diameter of the inner spring Sp2).

Therefore the inner spring Sp2 makes pressure contact with the outer periphery of each of the inner tubular wall part 813 of the common holder 81 and the large-diameter tubular part 855 of the inner holder 85 (refer to a sign b1 in FIGS. 7A and 7C).

Therefore in the rotation transmitting mechanism according to the modification in FIGS. 7A to 7C, the outer spring Sp1 makes pressure contact with the outer periphery of each of the outer tubular wall part 814 of the common holder 81 and the tubular wall part 864 of the outer holder 86, and the inner spring Sp2 makes pressure contact with the outer periphery of each of the inner tubular wall part 813 of the common holder 81 and the large-diameter tubular part 855 of the inner holder 85. In this state, the inner holder 85 and the outer holder 86 are connected to be incapable of rotating relative to each other.

As a result, when the common holder 81 connected to the tubular part 42 rotates in the clockwise direction in the circumferential direction around the center axis X as viewed in the direction of arrows A-A in FIG. 7A by the operation of the rotary knob 4, the outer holder 86 and the inner holder 85 rotate in the counterclockwise direction relative to the common holder 81.

Then, since the inner spring Sp2 makes pressure contact with the outer periphery of each of the inner tubular wall part 813 of the common holder 81 and the large-diameter tubular part 855 of the inner holder 85, the rotation of the common holder 81 is transmitted to the inner holder 85 and the outer holder 86 connected to be incapable of rotating relative to each other through the inner spring Sp2 making pressure contact with the outer periphery of each of the inner tubular wall part 813 of the common holder 81 and the large-diameter tubular part 855 of the inner holder 85.

In addition, when the common holder 81 rotates in a counterclockwise direction in the circumferential direction around the center axis X as viewed in the direction of arrows A-A in FIG. 7A, the outer holder 86 and the inner holder 85 rotate in the clockwise direction relative to the common holder 81.

Then, since the outer spring Sp1 makes pressure contact with the outer periphery of each of the outer tubular wall part 814 of the common holder 81 and the tubular wall part 864 of the outer holder 86, the rotation of the common holder 81 is transmitted to the inner holder 85 and the outer holder 86 connected to be incapable of rotating relative to each other through the outer spring Sp1 making pressure contact with the outer periphery of each of the outer tubular wall part 814 of the common holder 81 and the tubular wall part 864 of the outer holder 86.

Accordingly even in a case where the common holder 81 rotates in any of the clockwise direction and the counterclockwise direction as viewed in the direction of arrows A-A in FIG. 7A, the rotation input to the common holder 81 is transmitted to the inner holder 85 and the outer holder 86 connected to be incapable of rotating relative to each other through any of the outer spring Sp1 and the inner spring Sp2.

(4) In this way, the rotation transmitting mechanism of the installation mode of the outer spring Sp1 and the inner spring Sp2 in each of FIG. 4A to FIG. 7C is adopted as a rotation transmitting mechanism in the lever switch 1, which is configured such that the rotary knobs 3, 4 (first rotary knob and second rotary knob) are provided to be relatively rotatable coaxially on the one end part 21 side of the tubular case 2, the rotation of the rotary knob 3 is transmitted by the inner diameter-side rotation transmitting member 6 (first rotation transmitting member) for connecting the first shaft portion 61 (first shaft member) rotating integrally with the rotary knob 3 and the second shaft portion 63 (second shaft member) rotating integrally with the operating rod 10 (operating element) of the first switch (not illustrated) provided in the other end part 22 side of the case 2 to be capable of rotating integrally by the flexible shaft 62, and the rotation of the rotary knob 4 is transmitted by the outer diameter-side rotation transmitting member 7 (second rotation transmitting member) for connecting the tubular part 42 (first tubular member) inserted outside of the first shaft portion 61 side and the tubular member 71 (second tubular member) inserted outside of the second shaft portion 63 side for rotation transmission by the rotation transmitting mechanism.

As a result, even in a case of adopting the case 2 having the curved outer appearance, since the rotation of the rotary knob can be transmitted without providing the harness, an increase in manufacturing costs of the operating lever can be suppressed.

While only the selected embodiments have been chosen to illustrate the present invention, it will be apparent to those skilled in the art from this disclosure that various changes and modifications can be made therein without departing from the scope of the invention as defined in the appended claims. Furthermore, the foregoing description of the embodiment according to the present invention is provided for illustration only, and not for the purpose of limiting the invention as defined by the appended claims and their equivalents.

What is claimed is:

1. A rotation transmitting mechanism that is inserted outside of a rotation transmitting member for connecting a first shaft member and a second shaft member by a flexible shaft to be rotatable integrally and connects a first tubular member inserted outside of a first shaft member side and a second tubular member inserted outside of a second shaft member side for rotation transmission, the rotation transmitting mechanism comprising:
    a center axis,
    a first tubular holder connected to the first tubular member to be incapable of rotating relative thereto,
    a second tubular holder connected to the second tubular member to be incapable of rotating relative thereto,
    a third tubular holder provided to project from an inside of the second tubular holder to a first tubular holder side and connected to the second tubular holder to be incapable of rotating relative thereto,
    an inner coil spring having one end side and another end side in a longitudinal direction that are inserted inside of the first tubular holder and the third tubular holder, the one end side of the inner coil spring and the other end side of the inner coil spring being respectively fixed to the first tubular holder and the third tubular holder, and
    an outer coil spring having one end side and another end side in the longitudinal direction that are inserted outside of the first tubular holder and the third tubular holder, the one end side of the outer coil spring and the other end side of the outer coil spring being respectively fixed to the first tubular holder and the second tubular holder, wherein a winding direction of the inner coil spring is the same as that of the outer coil spring, wherein the second tubular holder is arranged in an angular position around the center axis such that a torsional stress causing an inner periphery of the outer coil spring to come into pressure contact with the first tubular holder and the third tubular holder acts on the outer coil spring, wherein the third tubular holder is arranged in an angular position around the center axis such that a torsional stress causing an outer periphery of the inner coil spring to come into pressure contact with the first tubular holder and the third tubular holder acts on the inner coil spring, and wherein the second tubular holder and the third tubular holder are connected to be incapable of rotating relative to each other.

2. The rotation transmitting mechanism according to claim 1, wherein, in a state where a center axis of the first tubular holder is in conformity with a center axis of the third tubular holder, the first tubular holder and the third tubular holder are provided in a positional relation in which a gap can be produced between the first tubular holder and the second tubular holder.

3. The rotation transmitting mechanism according to claim 1, wherein:
the second tubular holder includes an opening part exposing an outer periphery of the third tubular holder over a predetermined range in a circumferential direction around the center axis, and an engaging arm extending in the circumferential direction within the opening part,
an engaging projection with which the engaging arm is engaged is provided on the outer periphery of the third tubular holder in a region positioned within the opening part, and
the engaging arm in the second tubular holder is engaged with the engaging projection of the third tubular holder to connect the second tubular holder and the third tubular holder to be incapable of rotating relative to each other.

4. The rotation transmitting mechanism according to claim 1, wherein:
the first tubular holder has a projection projecting to a first tubular member side,
the first tubular member has a recessed groove with which the projection of the first tubular holder is engaged,
the second tubular holder has a projection projecting to a second tubular member side, and
the second tubular member has a recessed groove with which the projection of the second tubular holder is engaged, wherein the projection of the first tubular holder and the projection of the second tubular holder each have a tip end part and are formed in such a manner that a width of the projection of the first tubular holder and the projection of the second tubular holder in a circumferential direction relative to the center axis is narrower closer to the tip end part, and a width of the tip end part in the circumferential direction is narrower than a width in the circumferential direction of each of the recessed groove of the first tubular member and the recessed groove of the second tubular member.

5. A rotation transmitting mechanism that is inserted outside of a rotation transmitting member for connecting a first shaft member and a second shaft member by a flexible shaft to be rotatable integrally and connects a first tubular member inserted outside of a first shaft member side and a second tubular member inserted outside of a second shaft member side for rotation transmission, the rotation transmitting mechanism comprising:
a center axis,
a first tubular holder connected to the first tubular member to be incapable of rotating relative thereto,
a second tubular holder connected to the second tubular member to be incapable of rotating relative thereto,
a third tubular holder provided to project from an inside of the second tubular holder to a first tubular holder side and connected to the second tubular holder to be incapable of rotating relative thereto,
an inner tubular wall part extending from the first tubular holder to a third tubular holder side,
an outer wall part extending from the first tubular holder to a second tubular holder side and surrounding an outer periphery of the inner tubular wall part,
an inner coil spring having one end side and another end side in a longitudinal direction that are inserted outside of the inner tubular wall part and the third tubular holder, the one end side of the inner coil spring and the other end side of the inner coil spring being respectively fixed to the first tubular holder and the third tubular holder, and
an outer coil spring having one end side and another end side in the longitudinal direction that are inserted inside of the outer wall part and the third tubular holder, the one end side of the outer coil spring and the other end side of the outer coil spring being respectively fixed to the first tubular holder and the second tubular holder,
wherein the outer coil spring is formed to be larger in diameter than the inner coil spring,
wherein a winding direction of the inner coil spring is the same as that of the outer coil spring,
wherein the second tubular holder is arranged in an angular position around the center axis such that a torsional stress causing an outer periphery of the outer coil spring to come into pressure contact with the outer wall part and the third tubular holder acts on the outer coil spring,
wherein the third tubular holder is arranged in an angular position around the center axis such that a torsional stress causing an inner periphery of the inner coil spring to come into pressure contact with the inner tubular wall part and the third tubular holder acts on the inner coil spring, and
wherein the second tubular holder and the third tubular holder are connected to be incapable of rotating relative to each other.

6. The rotation transmitting mechanism according to claim 5, wherein, in a state where a center axis of the first tubular holder is in conformity with a center axis of the second tubular holder and a center axis of the third tubular holder, the first tubular holder, the second tubular holder and the third tubular holder are provided in a positional relation in which a gap can be produced respectively between the outer tubular wall part and the second tubular holder and between the inner tubular wall part and the third tubular holder.

7. The rotation transmitting mechanism according to claim 5, wherein:
the second tubular holder includes an opening part exposing an outer periphery of the third tubular holder over a predetermined range in a circumferential direction around the center axis, and an engaging arm extending in the circumferential direction within the opening part, an engaging projection with which the engaging arm is engaged is provided on the outer periphery of the third tubular holder in a region positioned within the opening part, and the engaging arm in the second tubular holder is engaged with the engaging projection of the third tubular holder to connect the second tubular holder and the third tubular holder to be incapable of rotating relative to each other.

8. A rotation transmitting mechanism that is inserted outside of a rotation transmitting member for connecting a first shaft member and a second shaft member by a flexible shaft to be rotatable integrally and connects a first tubular member inserted outside of a first shaft member side and a second tubular member inserted outside of a second shaft member side for rotation transmission, the rotation transmitting mechanism comprising:

a center axis, a first tubular holder connected to the first tubular member to be incapable of rotating relative thereto, a second tubular holder connected to the second tubular member to be incapable of rotating relative thereto, a third tubular holder provided to project from an inside of the second tubular holder to a first tubular holder side and connected to the second tubular holder to be incapable of rotating relative thereto, an inner tubular wall part extending from the first tubular holder to a third tubular holder side, an outer wall part extending from the first tubular holder to a second tubular holder side and surrounding an outer periphery of the inner tubular wall part, an inner coil spring having one end side and another end side in a longitudinal direction that are inserted inside of the inner tubular wall part and the third tubular holder, the one end side of the inner coil spring and the other end side of the inner coil spring being respectively fixed to the first tubular holder and the third tubular holder, and an outer coil spring having one end side and another end side in the longitudinal direction that are inserted inside of the outer wall part and the third tubular holder, the one end side of the outer coil spring and the other end side of the outer coil spring being respectively fixed to the first tubular holder and the second tubular holder, wherein a winding direction of the inner coil spring is in reverse to that of the outer coil spring, wherein the second tubular holder is arranged in an angular position around the center axis such that a torsional stress causing an outer periphery of the outer coil spring to come into pressure contact with the outer wall part and the second tubular holder acts on the outer coil spring, wherein the third tubular holder is arranged in an angular position around the center axis such that a torsional stress causing an outer periphery of the inner coil spring to come into pressure contact with the inner tubular wall part and the third tubular holder acts on the inner coil spring, and wherein the second tubular holder and the third tubular holder are connected to be incapable of rotating relative to each other.

9. The rotation transmitting mechanism according to claim 8, wherein, in a state where a center axis of the first tubular holder is in conformity with a center axis of the second tubular holder and a center axis of the third tubular holder, the first tubular holder, the second tubular holder and the third tubular holder are provided in a positional relation in which a gap can be produced respectively between the outer wall part and the second tubular holder and between the inner tubular wall part and the third tubular holder.

10. The rotation transmitting mechanism according to claim 8, wherein:

the second tubular holder includes an opening part exposing an outer periphery of the third tubular holder over a predetermined range in a circumferential direction around the center axis, and an engaging arm extending in the circumferential direction within the opening part, an engaging projection with which the engaging arm is engaged is provided on the outer periphery of the third tubular holder in a region positioned within the opening part, and the engaging arm in the second tubular holder is engaged with the engaging projection of the third tubular holder to connect the second tubular holder and the third tubular holder to be incapable of rotating relative to each other.

11. A rotation transmitting mechanism that is inserted outside of a rotation transmitting member for connecting a first shaft member and a second shaft member by a flexible shaft to be rotatable integrally and connects a first tubular member inserted outside of a first shaft member side and a second tubular member inserted outside of a second shaft member side for rotation transmission, the rotation transmitting mechanism comprising:

a center axis, a first tubular holder connected to the first tubular member to be incapable of rotating relative thereto, a second tubular holder connected to the second tubular member to be incapable of rotating relative thereto, a third tubular holder provided to project from an inside of the second tubular holder to a first tubular holder side and connected to the second tubular holder to be incapable of rotating relative thereto, an inner tubular wall part extending from the first tubular holder to a third tubular holder side, an outer wall part extending from the first tubular holder to a second tubular holder side and surrounding an outer periphery of the inner tubular wall part, an inner coil spring having one end side and another end side in a longitudinal direction that are inserted outside of the inner tubular wall part and the third tubular holder, the one end side of the inner coil spring and the other end side of the inner coil spring being respectively fixed to the first tubular holder and the third tubular holder, and an outer coil spring having one end side and another end side in the longitudinal direction that are inserted outside of the outer wall part and the second tubular holder, the one end side of the outer coil spring and the other end side of the outer coil spring being respectively fixed to the first tubular holder and the second tubular holder, wherein a winding direction of the inner coil spring is in reverse to that of the outer coil spring, wherein the second tubular holder is arranged in an angular position around the center axis such that a torsional stress causing an inner periphery of the outer coil spring to come into pressure contact with the outer wall part and the second tubular holder acts on the outer coil spring, wherein the third tubular holder is arranged in an angular position around the center axis such that a torsional stress causing an inner periphery of the inner coil spring to come into pressure contact with the inner tubular wall part and the third tubular holder acts on the inner coil spring, and wherein the second tubular holder and the third tubular holder are connected to be incapable of rotating relative to each other.

12. The rotation transmitting mechanism according to claim 11, wherein, in a state where a center axis of the first tubular holder is in conformity with a center axis of the second tubular holder and a center axis of the third tubular holder, the first tubular holder, the second tubular holder and the third tubular holder are provided in a positional relation in which a gap can be produced respectively between the outer wall part and the second tubular holder and between the inner tubular wall part and the third tubular holder.

13. The rotation transmitting mechanism according to claim 11, wherein:

the second tubular holder includes an opening part exposing an outer periphery of the third tubular holder over a predetermined range in a circumferential direction around the center axis, and an engaging arm extending in the circumferential direction within the opening part, an engaging projection with which the engaging arm is engaged is provided on the outer periphery of the third tubular holder in a region positioned within the opening part, and the engaging arm in the second tubular holder is engaged with the engaging projection of the third tubular holder to connect the second tubular holder and the third tubular holder to be incapable of rotating relative to each other.

14. A lever switch comprising:

a first rotary knob and a second rotary knob provided to be relatively rotatable coaxially on one end side of a tubular case, a first rotation transmitting member configured to transmit rotation of the first rotary knob for connecting a first shaft portion rotating integrally with the first rotary knob and a second shaft portion rotating integrally with an operating element of a first switch provided on another end side of the tubular case to be capable of rotating integrally by a flexible shaft, a second rotation transmitting member configured to transmit rotation of the second rotary knob for connecting a first tubular member inserted outside of the first shaft portion and a second tubular member inserted outside of the second shaft portion for rotation transmission by a rotation transmitting mechanism, wherein, the rotation transmitting mechanism includes:

a center axis, a first tubular holder connected to the first tubular member to be incapable of rotating relative thereto, a second tubular holder connected to the second tubular member to be incapable of rotating relative thereto, a third tubular holder provided to project from an inside of the second tubular holder to a first tubular holder side and connected to the second tubular holder to be incapable of rotating relative thereto, an inner coil spring having one end side and another end side in a longitudinal direction that are inserted inside of the first tubular holder and the third tubular holder, the one end side of the inner coil spring and the other end side of the inner coil spring being respectively fixed to the first tubular holder and the third tubular holder, and an outer coil spring having one end side and another end side in the longitudinal direction that are inserted outside of the first tubular holder and the third tubular holder, the one end side of the outer coil spring and the other end side of the outer coil spring being respectively fixed to the first tubular holder and the second tubular holder, wherein the second tubular holder is arranged in an angular position around the center axis such that a torsional stress causing an inner periphery of the outer coil spring to come into pressure contact with the first tubular holder and the third tubular holder acts on the outer coil spring, wherein the third tubular holder is arranged in an angular position around the center axis such that a torsional stress causing an outer periphery of the inner coil spring to come into pressure contact with the first tubular holder and the third tubular holder acts on the inner coil spring, and wherein the second tubular holder and the third tubular holder are connected to be incapable of rotating relative to each other.

15. The lever switch according to claim 14, wherein in a state where a center axis of the first tubular holder is in conformity with a center axis of the third tubular holder, the first tubular holder and the third tubular holder are provided in a positional relation in which a gap can be produced between the first tubular holder and the second tubular holder.

16. The lever switch according to claim 14, further comprising:

an inner tubular wall part extending from the first tubular holder to a third tubular holder side, and an outer wall part extending from the first tubular holder to a second tubular holder side and surrounding an outer periphery of the inner tubular wall part, wherein the one end side of the inner coil spring and the other end side of the inner coil spring are inserted outside of the inner tubular wall part and the third tubular holder, wherein the one end side of the outer coil spring and the other end side of the outer coil spring are inserted inside of the outer wall part and the third tubular holder, wherein the outer coil spring is formed to be larger in diameter than the inner coil spring, and a winding direction of the inner coil spring is the same as that of the outer coil spring.

17. The lever switch according to claim 14, further comprising:

an inner tubular wall part extending from the first tubular holder to a third tubular holder side, and an outer wall part extending from the first tubular holder to a second tubular holder side and surrounding an outer periphery of the inner tubular wall part, wherein the one end side of the inner coil spring and the other end side of the inner coil spring are inserted inside of the inner tubular wall part and the third tubular holder, wherein the one end side of the outer coil spring and the other end side of the outer coil spring are inserted inside of the outer wall part and the third tubular holder, and wherein a winding direction of the inner coil spring is in reverse to that of the outer coil spring.

18. The lever switch according to claim 14, further comprising:

an inner tubular wall part extending from the first tubular holder to a third tubular holder side, and an outer wall part extending from the first tubular holder to a second tubular holder side and surrounding an outer periphery of the inner tubular wall part, wherein the one end side of the inner coil spring and the other end side of the inner coil spring are inserted outside of the inner tubular wall part and the third tubular holder, wherein the one end side of the outer coil spring and the other end side of the outer coil spring are inserted outside of the outer wall part and the second tubular holder, and wherein a winding direction of the inner coil spring is in reverse to that of the outer coil spring.

19. The lever switch according to claim 14, wherein:

the second tubular holder includes an opening part exposing an outer periphery of the third tubular holder over a predetermined range in a circumferential direction around the center axis, and an engaging arm extending in the circumferential direction within the opening part, an engaging projection with which the engaging arm is engaged is provided on the outer periphery of the third tubular holder in a region positioned within the opening part, and the engaging arm in the second tubular holder is engaged with the engaging projection of the third tubular holder to connect the second tubular holder and the third tubular holder to be incapable of rotating relative to each other.

20. The lever switch according to claim 14, wherein:

the first tubular holder has a projection projecting to a first tubular member side, the first tubular member has a recessed groove with which the projection of the first tubular holder is engaged, the second tubular holder has a projection projecting to a second tubular member side, and the second tubular member has a recessed groove with which the projection of the second tubular holder is engaged, wherein the projection of the first tubular holder and the projection of the second tubular holder each have a tip end part and are formed in such a manner that a width of the projection of the first tubular holder and the projection of the second tubular holder in a circumferential direction relative to the center axis is narrower closer to the tip end part, and a width of the tip end part in the circumferential direction is narrower than a width in the circumferential direction of each of the recessed groove of the first tubular member and the recessed groove of the second tubular member.

* * * * *